(12) United States Patent
Hupfeld et al.

(10) Patent No.: US 10,521,403 B1
(45) Date of Patent: Dec. 31, 2019

(54) SYSTEM AND METHOD OF PROVIDING FAULT-TOLERANT FILE REPLICATION

(71) Applicant: Quobyte Inc., Boston, MA (US)

(72) Inventors: Felix Hupfeld, Berlin (DE); Bjoern Kolbeck, Berlin (DE)

(73) Assignee: Quobyte Inc., Boston, MA (US)

( * ) Notice: Subject to any disclaimer, the term of this patent is extended or adjusted under 35 U.S.C. 154(b) by 722 days.

(21) Appl. No.: 15/209,613

(22) Filed: Jul. 13, 2016

Related U.S. Application Data

(63) Continuation of application No. 14/622,355, filed on Feb. 13, 2015, now abandoned.

(51) Int. Cl.
*G06F 16/17* (2019.01)
*G06F 16/178* (2019.01)
*H04L 29/08* (2006.01)
*G06F 11/14* (2006.01)

(52) U.S. Cl.
CPC ........ *G06F 16/178* (2019.01); *G06F 11/1471* (2013.01); *H04L 67/1097* (2013.01); *G06F 2201/80* (2013.01); *G06F 2201/805* (2013.01)

(58) Field of Classification Search
CPC . G06F 16/178; G06F 11/1471; G06F 2201/80
See application file for complete search history.

(56) References Cited

U.S. PATENT DOCUMENTS

| | | | | |
|---|---|---|---|---|
| 6,367,029 B1* | 4/2002 | Mayhead | ............ | G06F 11/1625 709/203 |
| 2003/0095793 A1* | 5/2003 | Strothmann | ..... | G11B 20/10009 386/241 |

OTHER PUBLICATIONS

Budhiraja et al, "The Primary-Backup Approach", Department of Computer Science, Cornell University, 18 pages. (Year: 1993).*
Alsberg, Peter A. and Day, John D., A Principle for Resilient Sharing of Distributed Resources, In ICSE '76: Proceedings of the 2nd international conference on Software engineering, IEEE Computer Society Press, pp. 562-570 (1976).
Budhiraja, N. et al., Chapter 8: The Primary/Backup Approach, ACM Press/Addison-Wesley Publishing Co., pp. 199-216 (1993).
Burrows, Mike, The Chubby lock service for loosely-couled distributed systems, In Proceedings of the 7th Symposium on Operating System Design and Implementation, 16 pages (2006).

(Continued)

*Primary Examiner* — Loc Tran
(74) *Attorney, Agent, or Firm* — William R. Haulbrook; Alexander D. Augst; Choate, Hall & Stewart LLP

(57) ABSTRACT

Systems and methods are provided for fault-tolerant file replication. A request including an operation and a file identifier is received. It is determined if the operation is of a predetermined type of operations. If the operation is of a predetermined type of operation, a target local replica file is identified. It is determined whether the target local replica file is a primary replica. If the target local replica file is the primary replica, the operation included in the request is executed. Otherwise, one or more of the set of storage devices on which remote replica files associated with the file identifier are stored are identified. In turn, the remote replica file that is the primary replica is identified. The request is transmitted to storage device on which the identified remote replica file that is the primary replica is stored.

16 Claims, 11 Drawing Sheets

(56) References Cited

OTHER PUBLICATIONS

Défago, X. et al., Total Order Broadcast and Multicast Algorithms: Taxonomy and Survey, School of Information Science, Japan Advanced Institute of Science and Technology, School of Information & Communication Sciences, Swiss Federal Institute of Technology in Lausanne, Information & Systems, PRESTO, Japan Science and Technology Agency, IS-RR-2003-009, pp. 1-53 (2003).
Factor, M. et al., Object storage: The Future Building Block for Storage Systems, A Position Paper, In 2nd International IEEE Symposium on Mass Storage Systems and Technologies, 101-105 (2005).
Fekete, Alan and Ramamritham, Krithi, Chapter 1: Consistency Models for Replicated Data, In Bernadette Charron-Bost, Fernando Pedone, and André Schiper, editors, Replication, 5959:1-17 (2010).
Gray, Cary G. and Cheriton, David R., Leases: An Efficient Fault-Tolerant Mechanism for Distributed File Cache Consistency, ACM Press, pp. 202-210 (1989).
Hupfeld, F. et al., The XtreemFS architecture—a case for object-based file systems in Grids, Concurrency and Computation: Practice and Experience, 20(17):2049-2060 (2008).
IEEE Std 1003.1-2008. POSIX.1-2008, The Open Group Base Specifications Issue 7. The Open Group, 2008.
Jiménez-Peris, R. et al., Are quorums an alternative for data replication? ACM Trans. Database Syst., 28(3):257-294 (2003).
Kolbeck, B. et al., Flease—Lease Coordination without a Lock Server, In Proceedings of the 2011 IEEE International Symposium on Parallel&Distributed Processing, IEEE Computer Society, 11 pages (2011).
Mesnier, M. et al., Object-based storage, IEEE Communications Magazine, pp. 84-90 (2003).

\* cited by examiner

SYSTEM AND METHOD OF PROVIDING FAULT-TOLERANT FILE REPLICATION

CROSS-REFERENCE TO RELATED APPLICATIONS

This patent application is a Continuation Application of U.S. patent application Ser. No. 14/622,355, filed on Feb. 13, 2015, the content of which is hereby incorporated herein by reference in its entirety.

FIELD OF THE INVENTION

This invention generally relates to replicating computer files, and more particularly to systems and methods for providing fault-tolerant file replication.

BACKGROUND

Replication refers to the concept of distributing replicas of data (e.g., files) to distributed storage devices, so as to make data more available compared to scenarios in which the data is stored on a single storage device. The replicas of the data are continuously updated in order to ensure that up-to-date data is readily available and accessible. That is, data replication systems maintain a consistency invariant that is maintained (e.g., stored) regardless of any failures that can occur in distributed computing systems. Such failures may include message loss, hardware failures, network partitioning, message corruption, message duplication, message alteration, and the like.

Fault-tolerance refers to the concept of enabling systems to continuously function despite failure by or of one or more of the system's components. For instance, in the event of a temporary failure by or of a system component, such as the system's storage device (or components connecting the system to the storage device), the system can continue to function using the replicas stored in the distributed storage devices. In the event of a permanent failure by or of the system's components, including the system's storage device and/or corruption of the data stored therein, the systems' replacement storage device can be replenished using the replicas stored in the distributed storage devices.

In this way, fault-tolerant file replication systems are equipped to partially function even at reduced efficiency, while avoiding a total system failure. Making the data available, via replicas, in order to prevent complete system breakdowns is beneficial in all computing scenarios, but is of particular importance in critical systems such as: fire alarms, emergency dispatching, electricity generation, robotic surgery, nuclear reaction, defibrillators, radiation therapy, infusion pumps, construction equipment, amusement rides, scuba equipment, railway signaling, airbags, braking, power steering, advanced driver assistance, battery management, electric park, air traffic control, flight planning, radio navigation, space flight, and rocket launch.

Traditionally, data replication mechanism rely on replication logs. Replication logs store a list of all changes to a file in a sequential order, assign each change with a consecutive number, and append those changes to a persistent log on each replica. To update a replica, the changes in the persistent log are applied to the replica in the order specified in the persistent log, thereby ensuring that all replicas are executing the same changes in the same order established in the replication log.

One drawback, however, is that traditional replication mechanisms such as those employing replication logs are inefficient because they require changes to replicas to be sequentially written. In other words, a series of updates to parts of a file (e.g., disjunct parts of a file) are processed one after the other. Thus, such replication mechanisms do not exploit the ability of storage devices to concurrently execute a series of operations.

Moreover, traditional replication mechanisms which require writing each change and/or update twice: once to a persistent log corresponding to the replica, and a second time to the replica file itself. Thus, each change and/or update to a file results in two independent input/output (I/O) operations to/from the storage device on which the replica is stored. As a result, storage devices are faced with additional storage and/or processing burdens. Other traditional replication systems merely update the persistent log of the replica and, at a later time, update the replica file itself. This results in systems having to consult the persistent log each time the replica is attempted to be accessed, to ensure that the replica contains the most up-to-date data.

Given the foregoing, it would be beneficial to provide fault-tolerant file replication that allows concurrent processing, consistency to linearizability, and direct modification of replicas. It would also be beneficial to provide fault-tolerant file replication that efficiently updates replicas while minimizing the processing and storage burden on distributed storage devices.

SUMMARY

The example embodiments presented herein provide systems and methods of providing fault-tolerant file replication.

In one aspect, the present disclosure describes a system for providing fault-tolerant file replication. The system includes a memory to store a plurality of local replica files. The system also includes a processor to receive, over a network, a request including an operation and a file identifier. The processor determines if the operation is of a predetermined type of operations; and in the event that it is determined that the operation is of a predetermined type of operation, the processor identifies a target local replica file, from the plurality of local replica files stored in the memory, associated with the file identifier. The processor determines whether the target local replica file is a primary replica, and in the event that the target local replica file is the primary replica, the processor executes the operation included in the request. In the event that the local replica file is not the primary replica, a response is transmitted to a client system, indicating that the local replica file is not the primary replica.

In some implementations, the predetermined type of operation is one of a read operation, a write operation and a truncate operation.

In some implementations, the processor determines whether any of the target local replica file and the remote replica files associated with the target file is the primary replica. The processor, in the event that none of the target local replica file and the remote replica files associated with the target file is the primary replica, transmits the target local replica file or an identifier corresponding to the target local replica file to a primary election service, to establish the primary replica from one of the target local replica file and the remote replica files associated with the target file.

In some implementations, each of the local replica files includes a corresponding identifier, a sequence of objects, metadata, a truncate operation log, and a size of each object in the sequence of objects. The metadata includes a primary epoch, and each object in the sequence of objects includes a respective version.

In some implementations, the operation included in the request is a write operation; the request includes an object offset and data. The processor updates an object corresponding to the object offset in the target local replica file using the data included in the request. The processor also transmits, over the network, to the one or more of the set of storage devices on which remote replica files associated with the target file are stored, instructions to update an object corresponding to the object offset in the respective remote replica file, using the data received in the request.

In some implementations, the processor modifies the target local replica file based on the request. Concurrently, the processor transmits instructions to the one or more of the set of storage devices on which remote replica files associated with the target file are stored, to modify the remote replica files associated with the target file based on the request.

In some implementations the operation included in the request is a write operation or a truncate operation.

In some implementations, the processor receives a response from each of the one or more of the set of storage devices on which the remote replica files associated with the file identifier are stored, the response indicating whether modifying the remote replica files succeeded. The processor also determines that the replication of the target file succeeded when the number of received responses matches or exceeds a predetermined quorum value.

In another aspect, the present disclosure describes a system for providing fault-tolerant file replication. The system includes a memory to store replica files. The system also includes a processor to receive, over a network, from one of a plurality of replication servers, first instructions to perform a first operation on one of the replica files stored in the memory. The processor also performs the first operation on the replica file based on the received instructions. The operation is performed within a predetermined amount of time.

In another aspect, the present disclosure describes a system for providing fault-tolerant file replication. The system includes a memory to store replica files. The system also includes a processor to execute first instructions to perform a first operation on one object of one of the replica files stored in the memory. The processor also transmits, over the network, to one of a plurality of replication servers, second instructions to perform a second operation on an object of a replica file stored in a memory of the one of the plurality of replication servers. The first operation is performed at a first instance. The second operation is performed at a second instance. The first instance and the second instance at least partially overlap.

In some implementations, the processor executes third instructions to perform a third operation on another object of the one of the replica files stored in the memory. The third operation is performed at a third instance. The first instance and the third instance at least partially overlap.

In some implementations, the processor executes fourth instructions to perform a fourth operation on the one object of the one of the replica files stored in the memory. The fourth operation is performed at a fourth instance. The first instance and the fourth instance are sequential. The fourth instance and the third instance are concurrent.

In some implementations, the object of the one of the replica files stored in the memory and the object of the replica file stored in the memory of the one of the plurality of replication servers are the same at an instance after the first instance and the second instance.

In another aspect, the present disclosure describes a method for providing fault-tolerant file replication. A request is received, over a network, including an operation and a file identifier. It is determined if the operation is of a predetermined type of operations. In the event that it is determined that the operation is of a predetermined type of operation, a target local replica file is identified, from a plurality of local replica files stored in a memory, associated with the file identifier. It is determined whether the target local replica file is a primary replica. In the event that the target local replica file is the primary replica, the operation included in the request is executed. In the event that the local replica file is not the primary replica, a response is transmitted to a client system, indicating that the local replica file is not the primary replica.

In some implementations, the predetermined type of operation is one of a read operation, a write operation and a truncate operation.

In some implementations, it is determined whether any of the target local replica file and the remote replica files associated with the target file is the primary replica. In the event that none of the target local replica file and the remote replica files associated with the target file is the primary replica, the target local replica file or an identifier corresponding to the target local replica file is transmitted to a primary election service, to establish the primary replica from one of the target local replica file and the remote replica files associated with the target file.

In some implementations, each of the local replica files includes a corresponding identifier, a sequence of objects, metadata, a truncate operation log, and a size of each object in the sequence of objects. The metadata includes a primary epoch, and each object in the sequence of objects includes a respective version.

In some implementations, the operation included in the request is a write operation. The request includes an object offset and data. An object corresponding to the object offset in the target local replica file is updated using the data included in the request. Instructions to update an object corresponding to the object offset in the respective remote replica file are transmitted, over the network, to the one or more of the set of storage devices on which remote replica files associated with the target file are stored, using the data received in the request.

In some implementations, the target local replica file is modified based on the request and, concurrently, instructions are transmitted to the one or more of the set of storage devices on which remote replica files associated with the target file are stored, to modify the remote replica files associated with the target file based on the request.

In some implementations, the operation included in the request is a write operation or a truncate operation.

In some implementations, a response is received from each of the one or more of the set of storage devices on which the remote replica files associated with the file identifier are stored, the response indicating whether modifying the remote replica files succeeded. It is determined that the replication of the target file succeeded when the number of received responses exceeds a predetermined quorum value.

In some implementations, first instructions to perform a first operation on one of a replica files stored in a memory are received, over a network, from one of a plurality of replication servers. The first operation is performed on the replica file based on the received instructions. The operation is performed within a predetermined amount of time.

In some implementations, first instructions are executed to perform a first operation on one object of one of replica files stored in a memory. Second instructions to perform a second operation on an object of a replica file stored in a memory of the one of the plurality of replication servers are transmitted, over the network, to one of a plurality of replication servers. The first operation is performed at a first instance. The second operation is performed at a second instance. The first instance and the second instance at least partially overlap.

In some implementations, third instructions are executed to perform a third operation on another object of the one of the replica files stored in the memory. The third operation is performed at a third instance. The first instance and the third instance at least partially overlap.

In some implementations, fourth instructions are executed to perform a fourth operation on the one object of the one of the replica files stored in the memory. The fourth operation is performed at a fourth instance. The first instance and the fourth instance are sequential. The fourth instance and the third instance are concurrent.

In some implementations, the object of the one of the replica files stored in the memory and the object of the replica file stored in the memory of the one of the plurality of replication servers are the same at an instance after the first instance and the second instance.

In some implementations, non-transitory computer-readable mediums include sequences of instructions that cause one or more processors to perform the functions described herein.

Elements from embodiments of one aspect of the invention may be used in other aspects of the invention (e.g., elements of claims depending from one independent claim may be used to further specific embodiments of other independent claims). Other features and advantages of the invention will be apparent from the figures, detailed description, and claims.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1:
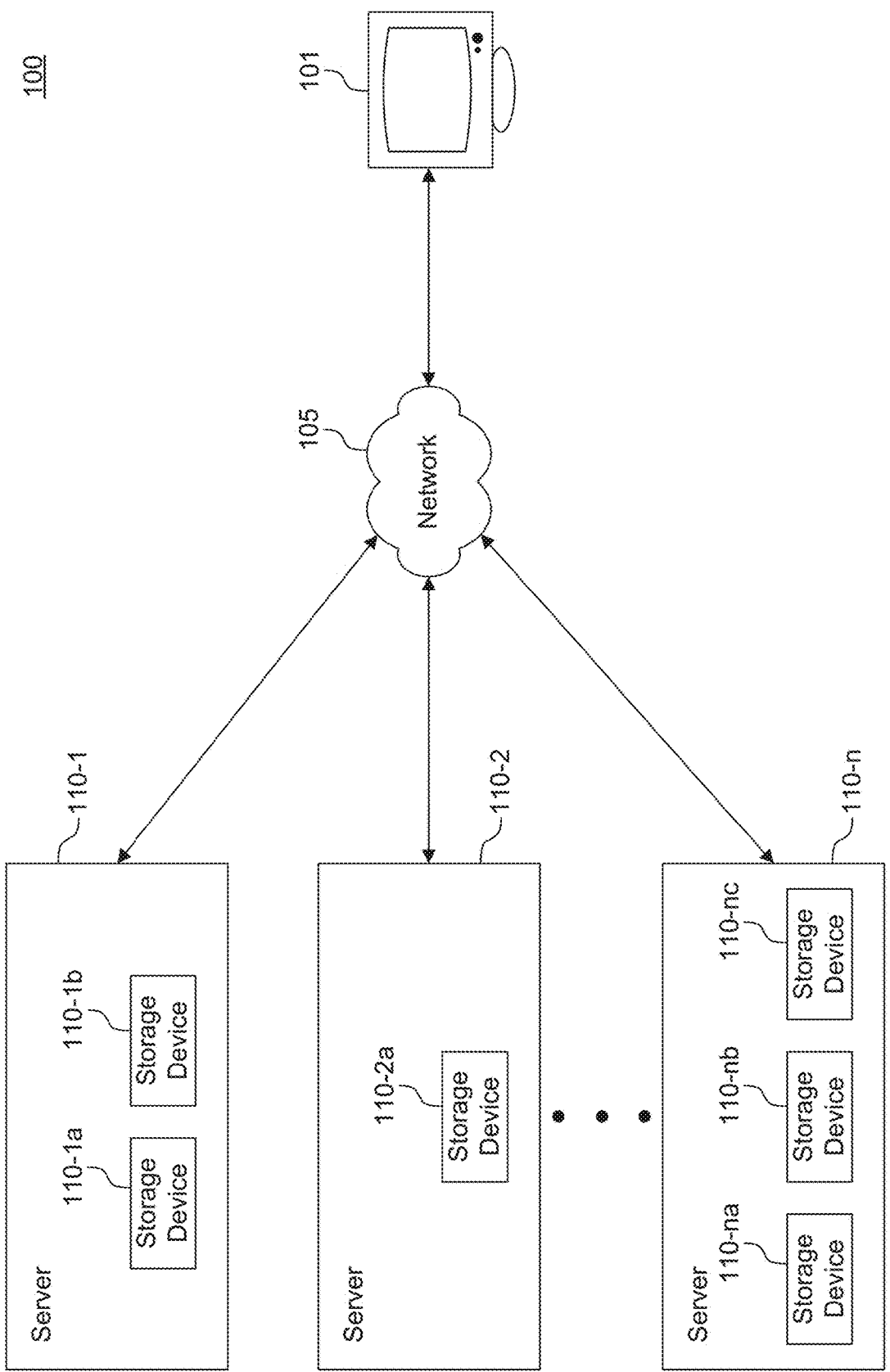
FIG. 1 is a block diagram of an exemplary system for providing fault-tolerant file replication of files.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

FIG. 1 is a block diagram of an example system 100 (e.g., distributed storage system) for providing fault-tolerant file replication of files, which may be owned, managed, and/or controlled by a client 101. The client 101 is connected, via a network 105, to servers 110-1, 110-2, . . . , 110-n (collectively, "servers 110" or "110"), where replicas of the files owned, managed and/or controlled by the client 101 are stored. In some example implementations, the client 101 may refer to hardware and/or software. In some example implementations, the client 101 may be connected to, housed within, or included in one of the servers 110. That is, in some example implementations, the client 101 (and/or its functionality) may be included within a server (e.g., server 110-1).

The client 101 may be any system including at least a processor and memory. Examples of clients (e.g., client 101) include laptops, desktops, client systems, mobile systems, personal computers, tablets, servers, and the like.

Files owned, managed, and/or controlled by the client 101 are replicated to one or more of the servers 110. Each of the servers 110 may be a server equipped to store replicas of files, including, for example, a general purpose server, file server, storage server, database server, virtual machine, web server, network attached storage (NAS) servers, and the like.

Each of the servers 110 includes one or more processing means (e.g., processor) and one or more storage devices on which data, such a replicas, are stored. Specifically, as shown in FIG. 1, the server 110-1 includes two storage devices 110-1a and 110-1b; the server 110-2 includes a single storage device 110-2a, and the server 110-n includes three storage devices 110-na, 110-nb, 110-nc. The storage devices may be any means to store files (e.g., computer files), including, for example, disk drives, solid-state drives, disk arrays, non-volatile memory, and the like.

The servers 110 and the client 101 communicate via the network 105. It should be understood that the servers 110 and the client 101 may communicate over a plurality of networks. Examples of networks which can be employed include the Internet, a wide area network (WAN), virtual private network (VPN), storage area network (SAN), global area network (GAN), enterprise private network, local area network (LAN), a third-party network, and the like.

In some example implementations, multiple replicas of a single file (e.g., a primary replica, a secondary replica) may be stored in a single server. In such cases, replicas may communicate via interprocess communications such as shared memory, channels, sockets and/or pipes.

In some example implementations, other clients (not illustrated in FIG. 1) can be connected to one or more of the servers 110 in order to store replicas. It should also be understood that client 101, in some example implementations, may become connected and/or associated to other servers not illustrated in FIG. 1. and/or may become disconnected and/or disassociated from the servers 110.

The servers 110 and the client 101 may communicate over the network 105 using protocols such as Internet Protocol Suite (TCP/IP), HTTP, FTP, IMAP, Fibre Channel Protocol (FCP), Fibre Channel over Ethernet (FCoE), Internet SCSI (iSCSI), SMB/CIFS, NFS, SCSI, ATA over Ethernet (AoE), HyperSCSI, Infiniband, Remote DMA (e.g., RemoteDMA over Converged Ethernet (RoCE), and the like.

Although not illustrated in FIG. 1, each server 110 may include one or more services such as a replication service. A service is a program or set of instructions designed to perform one or more tasks. A replication service, for example, may be a program stored and/or running on the servers 110. The replication service is configured to manage replicas on its corresponding server. Tasks performed by the replication service may include reading, writing and/or truncating all or portions of replicas stored in the server. Each replication service includes a unique identifier (e.g., replication service identifier). It should be understood that, in some embodiments, the replication service may be stored and/or running on a system other than the system (e.g., server) for which the service is being run. That is, in some embodiments, the server 110-1 communicates with a replications service stored and/or running on a separate system, in order to perform replication tasks for the server 110-1.

In some example embodiments, sets of replicas (or a list of the sets of replicas) corresponding to a file may be defined and stored by a set membership service.

The client 101 may be used to create, modify (e.g., write, truncate) and/or delete files. When a file is created, modified and/or deleted, a replica of that file is similarly affected. That is, replicas stored on the servers 110 are either created, modified and/or deleted when a file is created, modified and/or deleted, respectively, by the client 101.

A file is a sequence of bytes with a well-defined length. In some example implementations, files are defined and/or structured in accordance with Portable Operating System Interface (POSIX) standards. Each file is structured into objects, which are abutting and non-overlapping portions and/or regions in the file. The objects have a defined length, which is known as the object size. In some example implementations, objects of a single file may differ in size (e.g., last object vs. first object). An object in a file may be referenced using an object offset, which is the starting position of the object within the file. Files can be modified using write operations. The write operations can modify units within objects. If a unit smaller than an object is to be modified, the affected object (e.g., the object corresponding to the unit) is read, modified, and written back. If a unit larger than an object (e.g., spanning multiple objects) is to be modified, the affected objects are read, modified, and written back.

Because files may be of any size, the last object in the file typically has specific properties that may differ from the properties of other objects in the file. For example, the last object may be smaller than the object size of the other objects in the file. That is, because the file length does not have to be a multiple of the object size, the last object of the file needs special treatment. First, the last object of a file may be shorter than the object size so that the replication system and method can handle files that do not end on object boundaries. Second, any writes to the last object are preferably of a size equal to the current size of the last object, or longer. Writes that would only modify parts of the last object are typically not allowed and require a read-modify-write cycle. For example, if the object size is 1024, and the last object has a length of 978, the system only accepts writes for the last object that are 978 bytes or longer.

Replicating a file includes creating a replica (e.g., replica file) of the file, or modifying an existing replica, on one or more of the servers 110. As mentioned above, a file may be replicated on the servers 110. Each of the servers 110 may include, for each file F, a set of corresponding replicas r:

$$F=\{r_0, r_1 \ldots r_n\}$$

A replica r may be expressed as:

$$r=(id, m, O, T, s)$$

That is, a replica r, may include: a unique identifier id (e.g., replica identifier); metadata m; a sequence of objects O; a truncate operation log T; and object size s. The unique identifier id is a unique string of characters corresponding to the replica r. The metadata m may be an epoch.

The replica also includes file data (e.g., of the file owned, managed and/or controlled by the client 101) divided and/or ordered into a sequence of objects O:

$$O=\{o_0, o_1 \ldots o_N\}$$

Each object o may be expressed as:

$$o=(i, v, d)$$

That is, each object o includes a sequence of objects including a sequence number i, a version v, and object data d. The sequence number i defines the position of the object within the file. The data d may be the unstructured data of the file being replicated. Unstructured data is characterized by the fact that it does not contain any relevant inner structure such as links or fields. Unstructured data may be subdivided into equal sized blocks. The specific size and/or length len of a specific object's data in bytes may be defined as:

$$\text{len}(o \cdot d) \rightarrow \mathbb{N}$$

In some example implementations, a version v may be, for example, a natural number in a sequence of elements (e.g., a tuple) composed of a primary epoch m and the update counter c, which may be expressed as:

$$v=(m,c) \in V = \mathbb{N}^+ \times \mathbb{N}^+$$

In some example implementations, a version of the replica other than v is v'. The version v', may be defined as:

$$v':=v+1 \text{ as } v':=(v \cdot m, v \cdot c+1)$$

In some implementations, the relation<between versions v and v' can be defined as:

$$v<v' \Leftrightarrow (v \cdot m < v' \cdot m) \lor (v \cdot m = v' \cdot m \land v \cdot c < v' \cdot c)$$

For example, an initial version of an object may be (1,1), which is issued in the first primary epoch for a first operation. The next operation is assigned version (1,2), followed by operation (1,3) and so on. When the primary role changes, and a new primary epoch is opened (e.g., by the PRIMARY_RESET operation, explained in further detail below with reference to FIG. 8), the first operation of this new epoch will be assigned version (2,1). That is, versions are ordered first by the primary epoch, then by the update counter.

Still referring to each replica r, the transaction operation log T is a log and/or record of each truncate operation performed on a replica file. In some example implementations, a truncate operation refers to a set of steps that cause the size of a file (e.g., replica) to be changed to a given length (e.g., number of bytes). That is, if the length of the replica file is larger than the size of the given length for the truncate operation, then the truncate operation causes the excess portion of the replica file to be discarded in order to make the resulting replica file equal to the given length for the truncate operation. On the other hand, if the length of the replica file is shorter than the size of the given length for the truncate operation, then the truncate operation causes the replica file to be extended. The extended portions of the resulting replica file are assigned values of zero.

A truncate operation t may be expressed as:

$$t=(v,l,i) \in V \times \mathbb{N} \times \mathbb{Z}$$

In such an expression, the version of the truncate operation is defined as $v \in V$; the length, in bytes, of the replica after the truncate is defined as $l \in \mathbb{N}$; and the sequence number of the last object in the replica after the truncate is defined as $i \in \mathbb{Z}$. In one example implementation, the truncate log $T \subset V \times \mathbb{N} \times \mathbb{Z}$ contains truncate operations that have shrunken the file.

The set of truncate operations in truncate log T may be expressed as:

$$T = \{t_0, t_1 \ldots t_N\}$$

Truncate operations in T are ordered by their respective versions:

$$\forall t_i, t_{i+1} : t_i \cdot v < t_{i+1} \cdot v$$

The last entry in the truncate log T is referred to as $t_N$.

Still referring to each replica r, the size of the replica may be defined as:

$$\text{len}(r) = |r \cdot O \setminus \{r \cdot o_N\}| * s + \text{len}(r \cdot o_N \cdot d)$$

Figure 2:
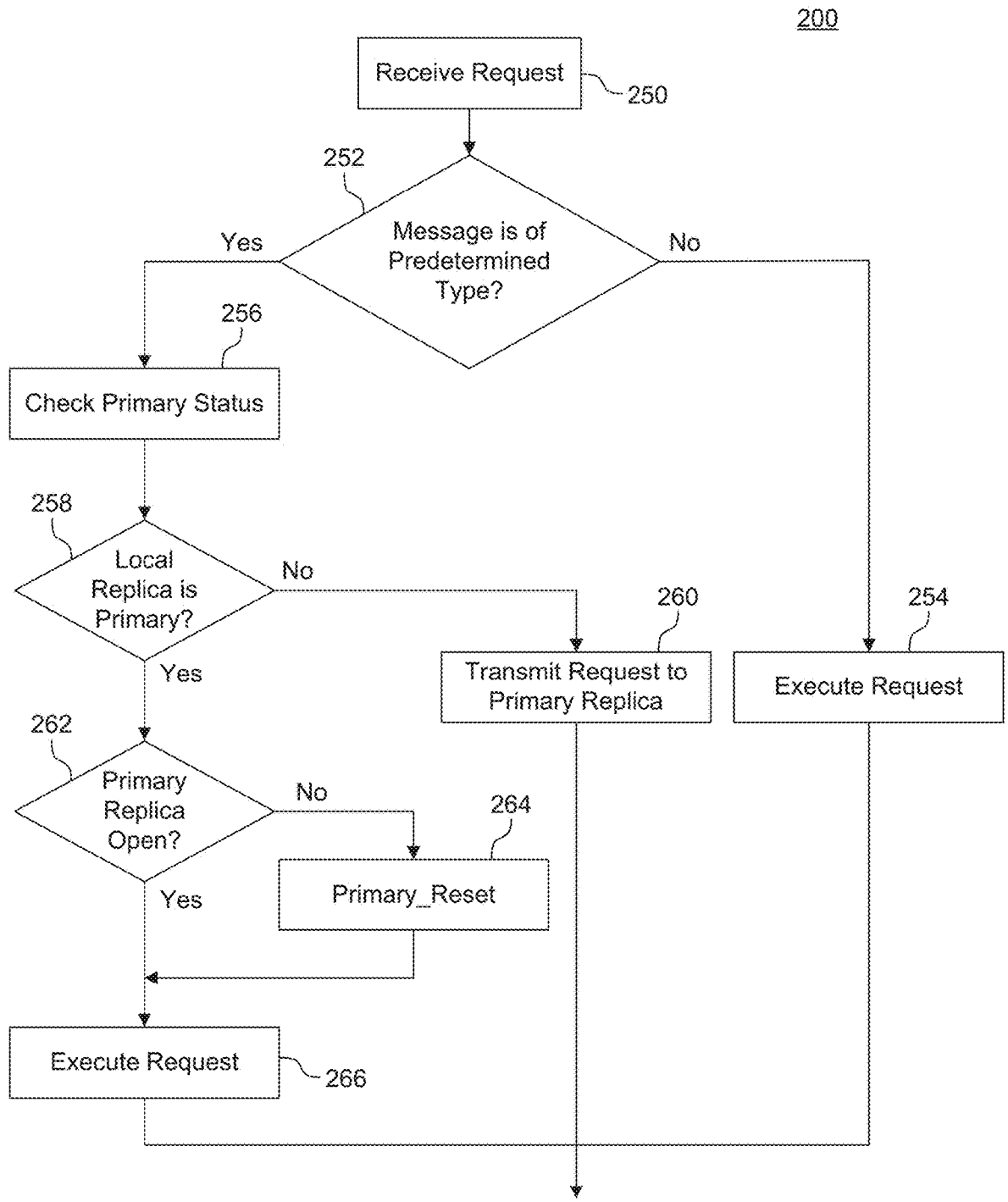
FIG. 2 is a flow chart illustrating an exemplary process for managing replication requests.

FIG. 2 is a flow chart illustrating an exemplary process 200 for managing replication requests. In some example embodiments, management of replications requests can be performed by a server (e.g., FIG. 1, server 110-1) or a similar system, for example including a replication service. At step 250, a request (e.g., replication request) is received. The request may include a file identifier corresponding to the file. In turn, in some example implementations, the file identifier is used to retrieve replicas corresponding to the file (and/or file identifier). The set of replicas may be retrieved from an external set membership service. The request may be received, for example, from a client (e.g., FIG. 1, client 101) or from a system operable to transmit requests in order to maintain replicas of files. In one example implementation, the contents of a file stored on and/or operated on by the client 101 are modified. The client 101, in turn, transmits a request, for example, to the server to similarly modify the replica of the file stored in the server. This way, the replica remains consistent with the file, as the file is modified on the client or at another system.

In turn, at step 252, the request received at step 250 is analyzed to determine whether it is a predetermined type of request. For example, in FIG. 2, predetermined types of requests include read requests, write requests, and truncate requests. The type of request is determined based on the operation included in the request. That is, a read request includes instructions to execute a read operation; a write request includes instructions to execute a write operation; and a truncate request includes instructions to execute a truncate operation. Execution of various operations, including read, write and truncate operations, is described in further detail below with reference to FIGS. 3-11.

If it is determined, at step 252, that the request is not of a predetermined type (e.g., read, write, truncate), the request is executed, at step 254, in accordance with the operations and/or instructions included in the request. Execution of various operations is described in further detail below with reference to FIGS. 3-12. In some example implementations, executing the request includes performing one or more operations and/or instructions on a replica (e.g., replica file). In turn, the replication process 200 ends.

On the other hand, if it is determined, at step 252, that the request is of a predetermined type (e.g., read, write, truncate), the request is analyzed, at step 256, to determine the primary status for the file identified in the request. Determining the primary status includes checking the replicas associated with the file, stored on any of the file servers, to identify whether any of those replicas has been assigned as the primary replica. In some example implementations, the primary replica is used as the consistency invariant, which is to be maintained before any other replicas. That is, the primary replica is the replica corresponding to a file which must be first updated, before executing any operation (e.g., read) on the file and or its replicas, to remain consistent with the file.

If it is determined that, at step 256, that none of the replicas corresponding to the file have been set as the primary replica, the primary status of the file is checked and, if necessary, an election process (e.g., primary election, primary election mechanism) is performed. An election process, therefore, is used to select a replica from the replicas of the file stored on servers, to assign a primary label. In some example implementations, the election process is performed when replicas of a file are created. In some example implementations, the election process is performed when a replica stored on a server is attempted to be accessed for a first time. In some example implementations, only one replica can be the primary replica and all other replicas are deemed to be secondary replicas.

A "primary" property of a replica (e.g., a primary replica) is a volatile property that is determined dynamically, for example, at or upon accessing the file (e.g., replica) The primary property is not part of a replica's persistent state. At any point in time, a single replica is the primary replica for a specific file. There are times where no primary is yet elected, for example when communications are hindered by hardware faults. The primary role may be revoked, for example when communication links are lost. A replica that is not primary is called secondary.

In some example implementations, suitable primary election mechanism include: a fixed assignment, using an external central lock service, or a decentralized lease negotiation protocol such as Flease. In some example implementations, a central lock service functions as follows: the service stores and/or includes a table that contains, for each file, the identity of the current primary replica, if there is one, and a timestamp that determines the validity of the primary replica selection. The central lock service may be contacted to request the primary replica role for a file (e.g., to select a primary replica). If there is already a primary replica corresponding to the file (e.g., stored in the in the table), and if the timestamp indicates that the primary selection is still valid, the requesting replica (and/or server on which the replica is stored) is informed (e.g., via a message or communication) of the identity of the primary replica and becomes secondary. If there is no valid primary replica, the requesting replica becomes the primary replica for a specific times period (e.g., 30 seconds). In turn, the end of the timespan (e.g., now +30 seconds) is stored along with the identity of the requester (e.g., requesting replica and/or server) in the table. In some example implementations, the primary replica may request an extension of the primary role. If the lock service determines that the service is actually still the primary, it grants this extension for another period of time (for example 30 seconds) and notes the fact by extending the validity timespan in the table entry. If the primary replica does not extend the validity of its role (e.g., due to a hardware failure that stops its operation), the selection as the primary becomes invalid or expired (e.g., implicitly) through the validity timestamp. In turn, the primary role becomes available for other replicas.

In turn, at step 258, it is determined whether the local replica is the primary replica. In some example implementations, the replica stored on the system (e.g., server) managing a replication process is referred to as the local replica. In some example implementations, the replica associated with a replication service managing a replication process is referred to as the local replica. If it is determined, at step 258, that the local replica is not the primary replica, the request is transmitted, at step 260, to the system (e.g., server) on which the primary replica is stored. In some example implementations, transmitting the request to the system on which the primary replica is stored includes determining which of the servers (e.g., servers 110) on a distributed storage system includes the primary replica, and transmitting the request over the network (e.g., network 105).

If it is determined, at step 258, that the local replica is indeed the primary replica, a check is performed, at step 262, to determine whether the local replica is open (e.g., when a replica is accessed to perform an operation on (e.g., read, write, truncate). If it is determined, at step 258, that the local replica is not open, a PRIMARY_RESET operation is performed, at step 264. Executing a PRIMARY_RESET operation is described in further detail below with reference to FIG. 8.

In turn, at step 266, the request, including, for example, a read, write or truncate operation, is executed. In turn, the replication process 200 ends.

In some example implementations, executing operations (e.g., by primary or secondary replicas) can be performed concurrently. That is, multiple operations can be performed on and/or to a single file (e.g., replica) at the same time (e.g., during instances of time that are the same and/or overlapping), without having to wait for responses indicating whether each operation succeeded or failed. For example, it is possible to execute operation A and then execute operation B before a response to operation A (e.g., success, failure) is received. It should be understood that multiple (e.g., more than 2) operations may be executed on and/or to a file without having to wait for a response regarding the execution of the first, and/or any, of the operations.

In some example implementations, multiple operations can be executed concurrently on different objects of a file (e.g., replica). In some example implementations, multiple operations to the same object are executed sequentially (e.g., during instances of time that are one after the other) in a manner that allows the resulting (e.g., end) file to be consistent.

Figure 3:
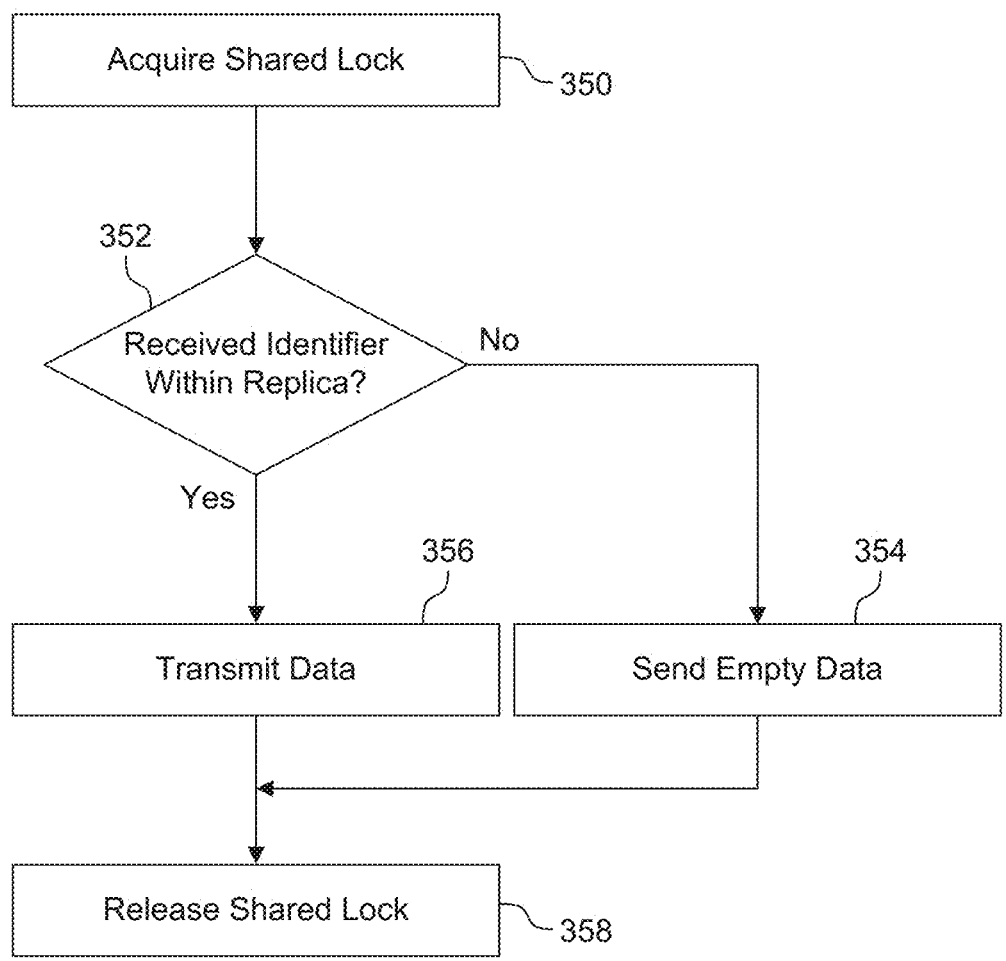
FIG. 3 is a flow chart illustrating an exemplary process for performing a read request.

FIG. 3 is a flow chart illustrating an exemplary process 300 for performing a read request. A read request, in some example implementations, is a request including a read operation. Generally, a read operation refers to a process of retrieving data from a file in memory. In some example implementations, the data that is read or read-out is transmitted to the requesting system.

The read request includes, for example, one or more identifiers corresponding to the objects in the replica file that are to be read. In some example implementations, the read request includes a file identifier. The identifiers may be sequence identifiers or byte offsets. The sequence identifiers define a position of an object in a file. The byte offsets defines the byte at which the object starts. For example, Table 1 illustrates and example of a file having three objects of size eight (e.g., eight bytes per object):

TABLE 1

| OBJECT | SEQUENCE IDENTIFIER | BYTE OFFSET |
| --- | --- | --- |
| Object 1 | 0 | 0 |
| Object 2 | 1 | 8 |
| Object 3 | 2 | 16 |

The byte offset corresponding to the start of an object may be calculated by multiplying the sequence identifier of an object by the size of the objects in the file.

At step 350, a reader-writer lock (or "lock") is acquired in shared mode. A lock is a mechanism that acts as a barrier or manager for executing operations on a file (e.g., replica file). In some implementations, each replica has a single lock. When an operation is to be performed on the replica, the operation acquires the lock in either shared or exclusive mode. The lock remains in the same mode while and until the operation is executed on the replica. When the execution of the operation is finished, the operation releases the lock.

When the lock is acquired and/or held by an operation in exclusive mode, only that operation may be performed on the file. On the other hand, in shared mode, a lock may be acquired and held at overlapping times, by multiple operations. In some example implementations, if an operation attempts to acquire the lock in shared mode while the lock is held by another operation in exclusive mode, the operation requesting the lock in shared mode will be suspended, until the operation holding the lock in exclusive mode has concluded or has released the lock. In some example implementations, if an operation attempts to acquire the lock in exclusive mode while the lock is held by one or more other operations in shared mode, the operation requesting the lock in exclusive mode will be suspended, until the other operations holding the lock in shared mode have concluded or have released the lock.

At step 352, it is determined whether the offset or sequence identifier received in the read request is lower than the offset or sequence identifier of the last object in the replica. In this way, it is determined whether the object to be read out is outside (e.g., non-existent) of the sequence of objects making up the replica. If it is determined, at step 352, that the received offset or sequence identifier is higher than the offset or sequence identifier of the last object in the replica, empty data (e.g., zero value) is returned, at step 354, to the requestor. In some example implementations, the requestor is the client (e.g., client 101) and/or system owning, controlling and/or managing the file corresponding to the replica. For example, if the sequence identifier received in the read request is 5 (e.g., seq_id=5), and the replica to be read is made up of three objects with sequence identifiers 0, 1, and 2, empty data is transmitted to the requestor because the received sequence identifier (seq_id=5) is not within the sequence of objects in the replica.

On the other hand, if it is determined at step 352 that the offset or sequence identifier received in the read request is lower than the offset or sequence identifier of the last object in the replica, the data in the corresponding object is transmitted, at step 356, to the requestor (e.g., the client). For example, if the sequence identifier received in the read request is 2 (e.g., seq_id=2), and the replica to be read is made up of three objects with sequence identifiers 0, 1, 2, the data in the object having a sequence identifier of 2 (seq_id=2) is transmitted to the requestor.

In turn, at step 358, the operation (e.g., read operation) releases the lock (e.g., shared-mode lock). In some example implementations, the lock is released when the requested operation (e.g., read) is completed.

Figure 4:
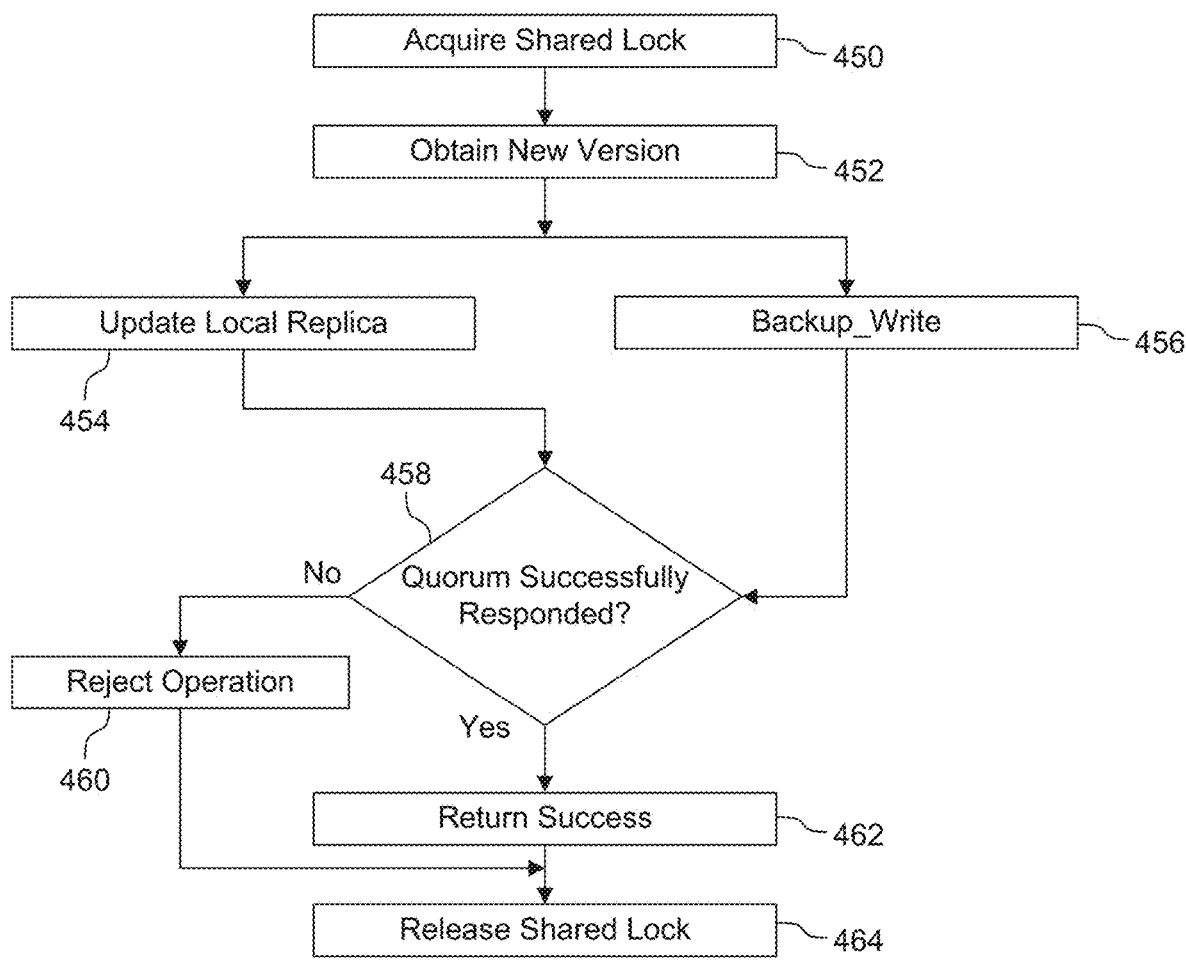
FIG. 4 is a flow chart illustrating an exemplary process for performing a write request.

FIG. 4 is a flow chart illustrating an exemplary process 400 for performing a write request. A write request, in some example implementations, is a request including a write operation. Generally, a write operation refers to a process of putting, inserting, or replacing data into a new or existing file in memory.

The write request includes, for example, a sequence identifier, a byte offset and data to be written to the file (e.g., replica file). In some example implementations, a write request includes a file identifier. The sequence identifier is used to identify a position of an object in a file, as described above with reference to Table 1. The byte offset defines a byte in the file. The sequence identifier and the byte offset are used to identify the object and specific byte in that object to begin writing the data included in the write request.

At step 450, a lock is acquired in shared mode. A lock is described above in detail with reference to FIG. 3. In turn, at step 452, a new version is obtained, for example, from a sequencer. A sequencer may be a counter, logic, or the like that is able to generate and output a new version number. In some example implementations, the sequencer increments a prior version of the an object in a replica by one. That is, if the object to be written to has a version number equal to, for example, four (version=4) prior to finalizing execution of the write operation, a version number equal to 5 (version=5) is generated at step 452.

In turn, at step 454, the local replica (e.g., the replica stored in the system or server processing the write operation) is updated. Updating the replica (e.g., the local replica) includes writing the data provided in the write request to the object and offset also provided in the write request. Updating of and/or writing to the replica may include inserting, appending, and/or replacing data in a file. In some example implementations, updating the replica includes replacing the version of the objects that were modified in the write operation with the version generated (e.g., by the sequencer) at step 452.

At step 456, other replicas of the file (e.g., secondary replicas, replicas other than the local and/or primary replica, remote replica) are updated. Secondary replicas (and/or replicas other than the local and/or primary replica), may be stored on other storage devices and/or other servers different than the storage device and/or server on which the local and/or primary replica is stored. In some example implementations, a storage device other than the storage device on which the local and/or primary replica is stored may be included in the same server.

To update secondary replicas, a BACKUP_WRITE operation and/or command (or the like) is sent to each of the secondary replicas. A BACKUP_WRITE operation is a set of instructions that, when executed, cause the secondary replicas to be updated using at least a portion of the information and/or data included in the BACKUP_WRITE operation and/or command. In some example implementations, the BACKUP_WRITE operation and/or command includes a truncate log, sequence identifier, byte offset, data, object version, and new object version (e.g., the version generated at step 452). Processing BACKUP_WRITE operations and the like is described in further detail below with reference to FIG. 6.

In some example implementations, the update of the local replica performed at step 454 and the update of the secondary replicas performed at step 456 are processed concurrently. In some example implementations, the update of the local replica performed at step 454 and the update of the secondary replicas performed at step 456 are processed within overlapping time periods. In some example implementations, the update of the local replica performed at step 454 and the update of the secondary replicas performed at step 456 are initiated during overlapping time periods. In some example implementations, a process of updating primary (e.g., local) and secondary replicas is not deemed to be successfully completed until a predetermined number of replicas indicate that they have successfully been updated. In some example implementations, a process of updating primary (e.g., local) and secondary replicas is not deemed to be successfully completed until a predetermined number of replicas indicate that they have successfully been updated within a predetermined amount of time.

In some example implementations, local replicas and/or remote replicas may have multiple operations performed thereon. That is, in the event that multiple replicas receive multiple operations (e.g., write requests), the resulting replicas after the multiple operations are performed should provide a consistent output.

In response to the updates performed (and/or attempted) at steps 454 and/or 456, the replicas transmit responses indicating whether their respective updating processes have been successfully executed or failed. A response may include data and/or a code indicating success or failure. In the event of a failure, the response may also include data and/or a code indicating the reason for the failure of the update.

At step 458, the received responses indicating the success or failure of updating replicas are analyzed to determine whether a quorum of replicas transmitted responses indicating that they had been successfully updated. A quorum is a predetermined number which must be met and/or exceeded in order to deem the update of the replicas (e.g., primary and secondary replicas) a success.

That is, if it is determined at step 458 that the number of responses including success data and/or a code matches or exceeds the quorum, a success message is returned, at step 462, to the requestor (e.g., client). The success message returned at step 462 indicates that the write request was successfully processed. In other words, the write request is successfully processed if the number of replicas updated meet and/or exceed the quorum requirement.

On the other hand, if it is determined at step 458 that the number of responses including failure data and/or a code exceeds the quorum, a failure and/or reject message is returned, at step 460, to the requestor (e.g., client). The failure and/or reject message returned at step 460 indicates that the write request failed and/or was not successfully processed. In other words, the write request fails if the number of replicas that failed to be updated meet and/or exceed the quorum requirement.

In turn, at step 464, the operation (e.g., write operation) releases the lock (e.g., shared-mode lock). In some example implementations, the lock is released when the requested operation (e.g., write) is completed and/or when a failure or success message is returned (e.g., transmitted) to the requestor (e.g., client).

Figure 5:
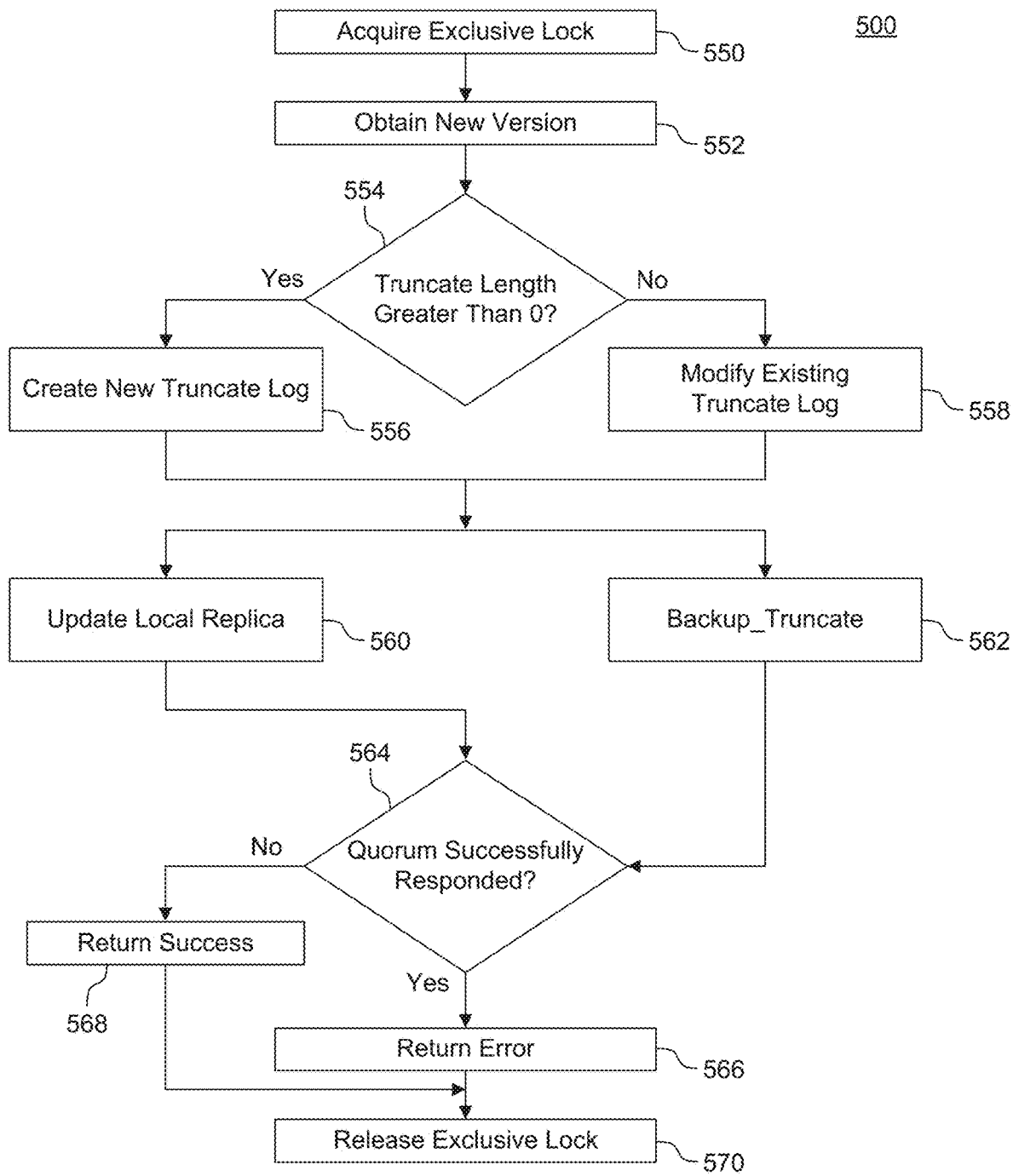
FIG. 5 is a flow chart illustrating an exemplary process for performing a truncate request.

FIG. 5 is a flow chart illustrating an exemplary process 500 for performing a truncate request. A truncate request, in some example implementations, is a request including a truncate operation. Generally, a truncate operation refers to a process of causing the size of a file (e.g., replica) to be changed to a given length (e.g., total number of bytes). That is, if the length of the replica file is larger than the size of the given length for the truncate operation, then the truncate operation causes the excess portion of the replica file to be discarded in order to make the resulting replica file equal to the given length for the truncate operation. On the other hand, if the length of the replica file is shorter than the size of the given length for the truncate operation, then the truncate operation causes the replica file to be extended. The extended portions of the resulting replica file are assigned values of zero.

For example, a truncate operation to truncate a file of length 10 (e.g., 10 bytes) to a length 12 (e.g., 12 bytes) results in the file size (e.g., length) being extended to 12 bytes, with the new bytes (e.g., byte 11 and byte 12) being assigned values of zero. On the other hand, for example, a truncate operation to truncate a file of length 10 (e.g., 10 bytes) to a length 8 (e.g., 8 byte) results in the file size (e.g., length) being shortened to 8 bytes, with the excess bytes (e.g., byte 9 and byte 10) being discarded.

With reference to FIG. 5, a truncate request includes, for example, a length to be used for the truncate operation. In some example implementations, the length is the total number of bytes which the replica (e.g., replica file) will be made up of after, and if, the truncate operation is successfully performed.

At step 550, a lock is acquired in exclusive mode. When the lock is acquired and/or held by an operation in exclusive mode, only that operation may be performed on the file. A lock is described above in detail with reference to FIG. 3. In turn, at step 552, a new version for the truncate operation and/or objects being modified in the truncate operation is obtained using, for example, a sequencer. A sequencer may be a counter, logic, or the like that is able to generate and output a new version number. In some example implementations, the sequencer increments a prior version of the truncate operation and/or objects to be modified by one. That is, if the objects to be modified or the truncate operation have a version number equal to, for example, four (version=4) prior to finalizing execution of the truncate operation, a version number equal to 5 (version=5) is generated at step 552.

In turn, at step 554, a determination is made as to whether the length included in the truncate request is equal to zero (1=0). In other words, at step 554, a determination is made as to whether the length of the replica after the truncate operation is performed is expected to be zero. If it is determined, at step 554, that the length included in the truncate request is equal to zero, the truncate log of the replica is replaced, at step 556, with a new (e.g., blank) truncate log, or the existing truncate log of the replica is reset (e.g., the contents of the existing truncate log are deleted).

If it is determined, at step 554, that the length included in the truncate request is greater than zero, the truncate log of the replica is appended, at step 558, to include the truncate request. That is, at step 558, information regarding and/or included in the truncate request is added and/or written to the truncate log.

At step 560, the local replica (e.g., the replica stored in the system or server processing the truncate operation) is truncated. Truncating the replica (e.g., the local replica) includes changing the length of the replica (e.g., replica file) to the length value included in the truncate request. For example, if the length included in the request is less than the length of the replica, the replica is updated so that the bytes in excess of the length included in the request are removed and/or deleted. If the length included in the request is greater than the length of the replica, the replica is updated so that additional bytes are added to the replica, resulting in a replica having a total number of bytes equal to the length of the replica. In some example implementations, truncating the replica includes replacing the version of the objects modified and/or acted on during the operation with the version generated (e.g., by the sequencer) at step 552.

At step 562, other replicas of the file (e.g., secondary replicas, replicas other than the local and/or primary replica, remote replica) are truncated. Secondary replicas (and/or replicas other than the local and/or primary replica), may be stored on other storage devices and/or other servers different than the storage device and/or server on which the local and/or primary replica is stored. In some example implementations, a storage device other than the storage device on which the local and/or primary replica is stored may be included in the same server.

To truncate secondary replicas, a BACKUP_TRUNCATE operation and/or command (or the like) is sent to each of the secondary replicas. A BACKUP_TRUNCATE operation is a set of instructions that, when executed, cause the secondary replicas to be truncated using at least a portion of the information and/or data included in the BACKUP_TRUNCATE operation and/or command. In some example implementations, the BACKUP_TRUNCATE operation and/or command includes a truncate log. In some example implementations, processing a BACKUP_TRUNCATE operation includes executing a REPLAY_TRUNCATES operation. Executing REPLAY_TRUNCATES operations is described in more detail below with reference to FIG. 7.

In some example implementations, the truncate of the local replica performed at step 560 and the truncate of the secondary replicas performed at step 562 are processed concurrently. In some example implementations, the truncate of the local replica performed at step 560 and the truncate of the secondary replicas performed at step 562 are processed within overlapping time periods. In some example implementations, the truncate of the local replica performed at step 560 and the truncate of the secondary replicas performed at step 562 are initiated during overlapping time periods. In some example implementations, a process of truncating primary (e.g., local) and secondary replicas is not deemed to be successfully completed until a predetermined number of replicas indicate that they have successfully been truncated. In some example implementations, a process of truncating primary (e.g., local) and secondary replicas is not deemed to be successfully completed until a predetermined number of replicas indicate that they have successfully been truncated within a predetermined amount of time.

In response to the truncates performed (and/or attempted) at steps 560 and/or 562, the replicas transmit responses indicating whether their respective truncating processes have been successfully executed or failed. A response may include data and/or a code indicating success or failure. In the event of a failure, the response may also include data and/or a code indicating the reason for the failure of the truncate.

At step 564, the received responses indicating the success or failure of truncating replicas are analyzed to determine whether a quorum of replicas transmitted responses indicating that they had been successfully truncated. A quorum is a predetermined number which must be met and/or exceeded in order to deem the truncate of the replicas (e.g., primary and secondary replicas) a success.

That is, if it is determined at step 564 that the number of responses including success data and/or a code meets or exceeds the quorum, a success message is returned, at step 566, to the requestor (e.g., client). The success message returned at step 566 indicates that the truncate request was successfully processed. In other words, the truncate request is successfully processed if the number of replicas truncated meet and/or exceed the quorum requirement.

On the other hand, if it is determined at step 564 that the number of responses including failure data and/or a code exceeds the quorum, a failure and/or reject message is returned, at step 568, to the requestor (e.g., client). The failure and/or reject message returned at step 568 indicates that the truncate request failed and/or was not successfully processed. In other words, the truncate request fails if the number of replicas that failed to be truncated meet and/or exceed the quorum requirement.

In turn, at step 570, the operation (e.g., truncate operation) releases the lock (e.g., exclusive-mode lock). In some example implementations, the lock is released when the requested operation (e.g., truncate) is completed and/or when a failure or success message is returned (e.g., transmitted) to the requestor (e.g., server, replica).

Figure 6:
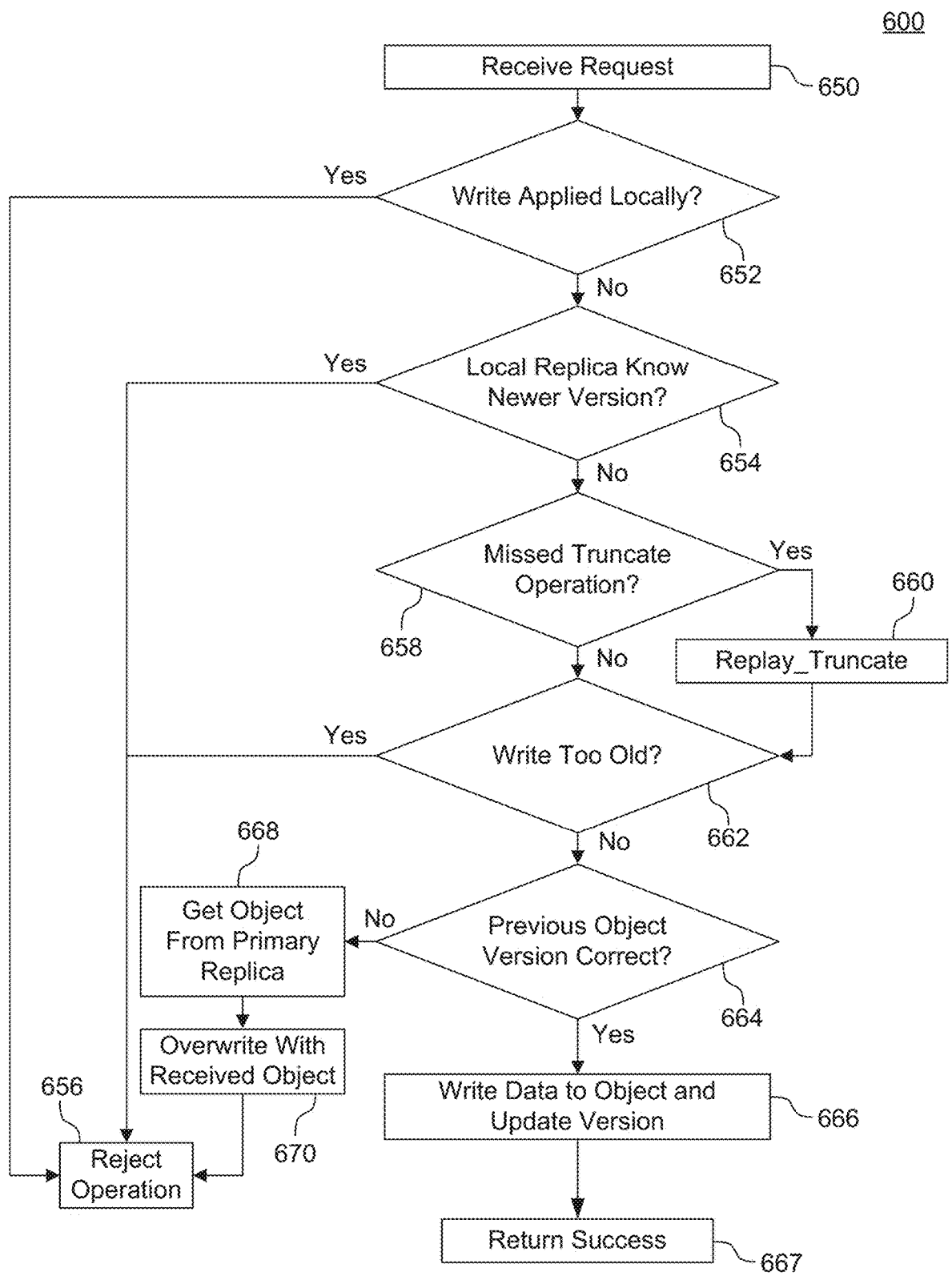
FIG. 6 is a flow chart illustrating an exemplary process performing a BACKUP_WRITE operation.

FIG. 6 is a flow chart illustrating an exemplary process 600 for performing a BACKUP_WRITE operation (e.g., BACKUP_WRITE operation request). A BACKUP_WRITE operation, in some example implementations, is a request and/or command including instructions to write data to a file (e.g., replica, secondary replica). Generally, writing data refers to a process of putting, inserting, or replacing data into a new or existing file in memory.

BACKUP_WRITE operations do not include complete files or objects to be modified, but instead a sequence of bytes that is to be written to a specific object and/or offset. By virtue of this operation, it is possible to provide more efficient communications by only sending deltas (e.g., data that has changed and/or will be changed) between the data of consecutive object versions, instead of the full object data. This delta is specific object o, which implies that the beginning and end of the region to modify (as determined by the offset and the length of data to be written len(d)) is in the same object.

In some implementations, to execute a write operation to local data (e.g., secondary replica), it must be determined that secondary replica has already applied any preceding write or truncate operation that modified the objects that the BACKUP_WRITE operation is about to update.

At step 650, a BACKUP_WRITE operation is received by a secondary replica and/or by the server and/or storage device on which the secondary replica is stored. The BACKUP_WRITE operation includes a truncate log, sequence identifier, byte offset, data, existing object and/or operation version, and new object and/or operation version. The information included in the BACKUP_WRITE operation is used, in some example implementations, to write the provided data to the provided object and offset of the replica (e.g., secondary replica).

In turn, at step 652, a determination is made as to whether the write operation attempting to be made via the BACKUP_WRITE operation has already been performed on the secondary replica. That is, the version of the object or objects being modified in the BACKUP_WRITE operation are compared to the new version included in the BACKUP_WRITE operation (e.g., request). If the existing version is equal to the new version included in the BACKUP_WRITE operation, the BACKUP_WRITE operation is deemed to have already been performed on the secondary replica. In such a scenario, the processing of the BACKUP_WRITE operation is rejected at step 656. In some example implementations, a failure and/or reject message is transmitted, at step 656, to the requestor (e.g., primary replica, server and/or storage on which primary replica is stored, client). The failure and/or reject message returned at step 656 indicates that the BACKUP_WRITE operation failed and/or was not successfully processed.

On the other hand, if it is determined at step 652 that existing version is not equal to the new object version included in the BACKUP_WRITE operation, a determination is made at step 654 as to whether the secondary replica is a newer than the primary replica. That is, at step 654, the version of the object is compared to the new version included in the BACKUP_WRITE operation. If the version of the object being modified is higher and/or greater than the new version included in the BACKUP_WRITE operation, the BACKUP_WRITE operation is deemed to have been previously performed on the secondary replica, and that the object(s) of the secondary replica has/have had a newer BACKUP_WRITE operation performed to it/them. In such a scenario, the processing of the BACKUP_WRITE operation is rejected at step 656. In some example implementations, a failure and/or reject message is transmitted, at step 656, to the requestor (e.g., primary replica, server and/or storage on which primary replica is stored, client). The failure and/or reject message returned at step 656 indicates that the BACKUP_WRITE operation failed and/or was not successfully processed.

On the other hand, if it is determined at step 654 that the version of the object being modified is not higher and/or greater than the new version included in the BACKUP_WRITE operation, the secondary replica is checked, at step 658, to determine whether all truncate operations have been applied to the secondary replica and/or its objects. In some example implementation, determining whether all truncate operations have been applied to the secondary replica includes comparing the version of the highest, newest, and/or latest truncate operation in the truncate log corresponding to the secondary replica against the highest, newest, and/or latest truncate operation in the truncate log included in the BACKUP_WRITE operation. If the version of the highest and/or latest truncate operation in the truncate log included in the BACKUP_WRITE is higher and/or greater than the version of the highest, newest and/or latest truncate operation in the truncate log corresponding to the secondary replica, it is concluded that not all truncate operations have been applied to the secondary replica. In some example implementations, determining whether all truncate operations have been applied to the secondary replica includes comparing each logged truncate operation in the truncate log corresponding to the secondary replica against the truncate log included in the BACKUP_WRITE operation.

If it is determined, at step 658, that the not all truncate operations have been applied to the secondary replica, a REPLAY_TRUNCATES operation is performed at step 660. Generally, a REPLAY_TRUNCATES operation is a set of instructions that, when executed, cause all truncate operations logged in the truncate log included in the BACKUP_WRITE operation to be performed on the secondary log and logged into the truncate log of the secondary log. Processing REPLAY_TRUNCATES operations and the like is described in further detail below with reference to FIG. 8. If it is determined, at step 658, that all of truncate operations have been applied to the secondary replica, the BACKUP_WRITE operation proceeds to step 662.

At step 662, a determination is made as to whether newer truncate operations have been applied to the secondary replica that the truncate operations logged in the truncate log included in the BACKUP_WRITE operation. That is, if the version of the highest, newest, and/or latest truncate operation in the truncate log corresponding to the secondary replica is higher and/or greater than the version of the highest, newest, and/or latest truncate operation in the truncate log included in the BACKUP_WRITE operation, it is concluded that the write operation is out of date (e.g., too old, expired).

In such a scenario where it is determined, at step 662, that the truncate operations applied to the second replica are newer than the truncate operations logged in the truncate log included in the BACKUP_WRITE operation, the BACKUP_WRITE operation is terminated. That is, the processing of the BACKUP_WRITE operation is rejected at step 656. In some example implementations, a failure and/or reject message is transmitted, at step 656, to the requestor (e.g., primary replica, server and/or storage on which primary replica is stored, client). The failure and/or reject message returned at step 656 indicates that the BACKUP_WRITE operation failed and/or was not successfully processed.

If it is determined, at step 662, that the truncate operations applied to the second replica are not newer than the truncate operations logged in the truncate log included in the BACKUP_WRITE operation, the BACKUP_WRITE operation proceeds to step 664. At step 664, the version of the object (e.g., based on the sequence identifier and/or byte offset included in the BACKUP_WRITE operation) in which the BACKUP_WRITE operation is to write to is compared to the version included in the BACKUP_WRITE operation. If it is determined, at step 664, that the two version are the same (e.g., equal to each other), the data included in the BACKUP_WRITE operation is written to the secondary replica, at step 666.

That is, at step 666, the secondary replica is updated by writing data to one or more of its objects. Writing to the secondary replica includes writing the data provided in the write request to the object and offset also provided in the write request. Updating of and/or writing to the secondary replica may include inserting, appending, and/or replacing data in a file. In some example implementations, updating and/or writing to the secondary replica includes replacing the version of the objects modified with the new version included in the BACKUP_WRITE operation.

If it is determined, at step 664, that the two version are not the same (e.g., equal to each other), the primary replica (e.g., the server and/or storage device on which the primary replica is stored) is retrieved, fetched, and/or requested at step 668. That is, due to the version mismatch identified at step 664, all or a portion of the data from the primary replica is obtained. In turn, at step 670, the data from the primary replica obtained at step 668 is used to overwrite a portion or all of the secondary replica.

Figure 7:
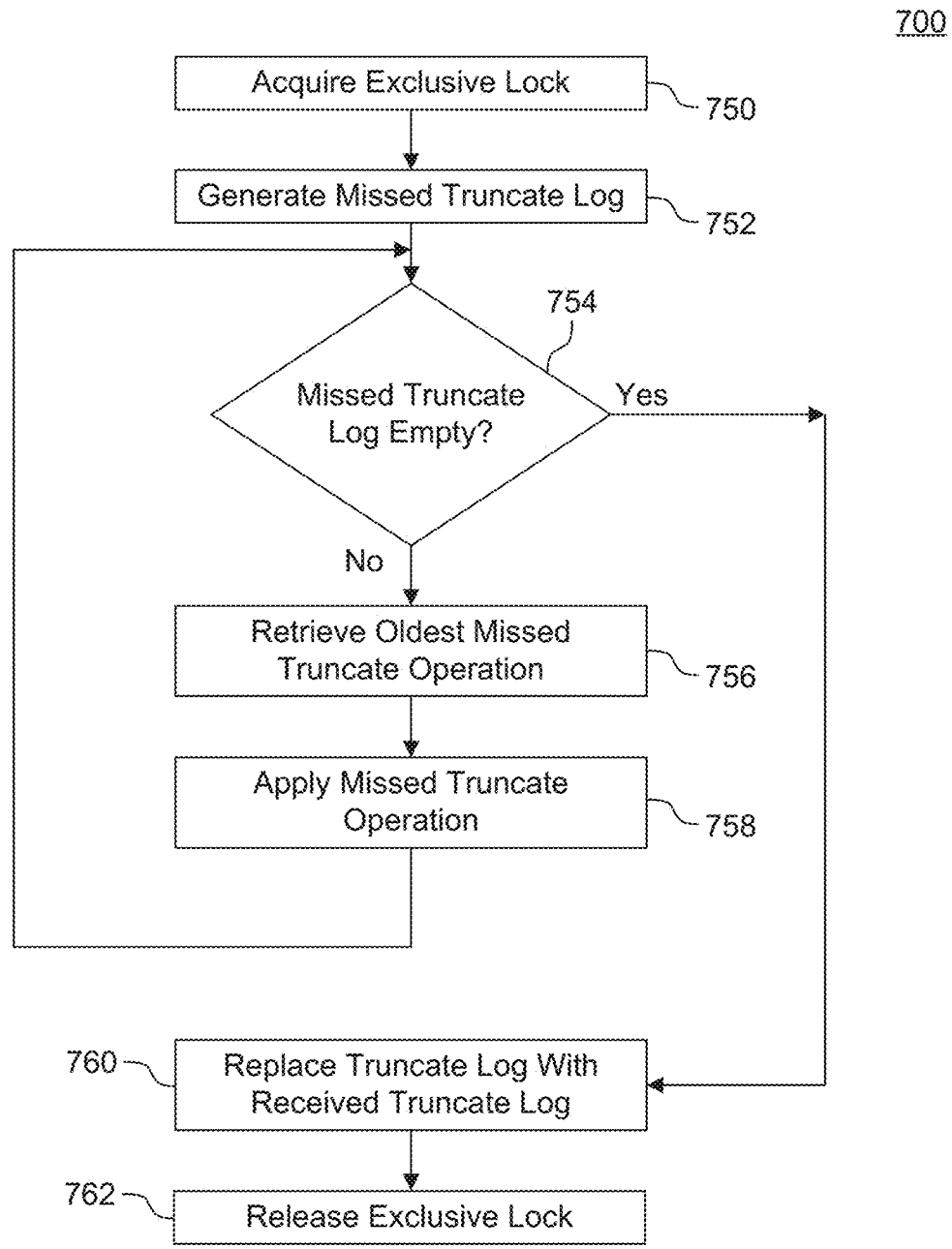
FIG. 7 is a flowchart illustrating an exemplary process for performing a REPLAY_TRUNCATE operation.

FIG. 7 is a flowchart illustrating an exemplary process 700 for performing a REPLAY_TRUNCATE operation (e.g., REPLAY_TRUNCATE operation request). A REPLAY_TRUNCATE operation, in some example implementations, is a request and/or command including instructions to apply a truncate log to a file (e.g., replica). The REPLAY_TRUNCATE operation may include a truncate log (e.g., truncate log corresponding to the primary replica). Applying a truncate log to a file generally includes executing some or all of the truncate operations logged in the truncate log to the file. In some example implementations, the REPLAY_TRUNCATE operation is used to apply missed truncates to a file (e.g., truncate operations included in a received truncate log but not included in the truncate log corresponding to the file). In some example implementations, applying a truncate log to a file is performed in an idempotent manner, meaning that the if the truncate log is applied a plurality of times to the file, the resulting file will be the same.

At step 750, a lock is acquired in exclusive mode. When the lock is acquired and/or held by an operation in exclusive mode, only that operation may be performed on the file. A lock is described above in detail with reference to FIG. 3.

In turn, at step 752, truncate operations that were not previously applied to the replica are determined. Determining missed truncate operations is described in further detail above with reference to FIG. 6. In some example implementations, a missed truncate log is generated including truncate operations logged in a received truncate log of another replica but not logged in the truncate log of the replica being acted on. In some example implementations, missed truncate operations are identified but not logged into a missed truncate log.

At step 754, the missed truncate log is checked to determine whether it includes any missed truncate operations. If it is determined, at step 754, that the missed truncate log includes missed truncate operations, truncate operations are applied to the replica one after the other until the missed truncate log is empty or has been fully processed. In other words, the oldest truncate operation in the missed truncate log is retrieved, at step 756. The oldest truncate operation in the missed truncate log may be identified using the version of the truncate operation. In some example implementations, if truncate operation version are sequentially incremented, then the oldest truncate operation in the missed truncate log is the truncate operation having the lowest version number.

In turn, the retrieved (e.g., oldest) truncate operation is applied to the replica, at step 758. Applying a truncate operation to a file (e.g., replica) is described in more detail above with reference to FIG. 5. The applied truncate operation is removed from the missed truncate log.

The REPLAY_TRUNCATES operation repeats (e.g., loops) steps 754, 756 and 758 until the missed truncate log is empty (e.g., until all truncate operation in the missed truncate log have been processed).

If it is determined, at step 754, that the missed truncate log is empty, the truncate log of the replica is replaced, at step 760, with the truncate log included in the REPLAY_TRUNCATES operation (e.g., the truncate log corresponding to another replica). In some example implementations, the contents of the truncate log of the replica being acted on are replaced with the contents of the truncate log of the primary replica.

In turn, at step 762, the operation (e.g., REPLAY_TRUNCATES operation) releases the lock (e.g., exclusive-mode lock). In some example implementations, the lock is released when the requested operation (e.g., truncate) is completed and/or when a failure or success message is returned (e.g., transmitted) to the requestor (e.g., client).

Figure 8:
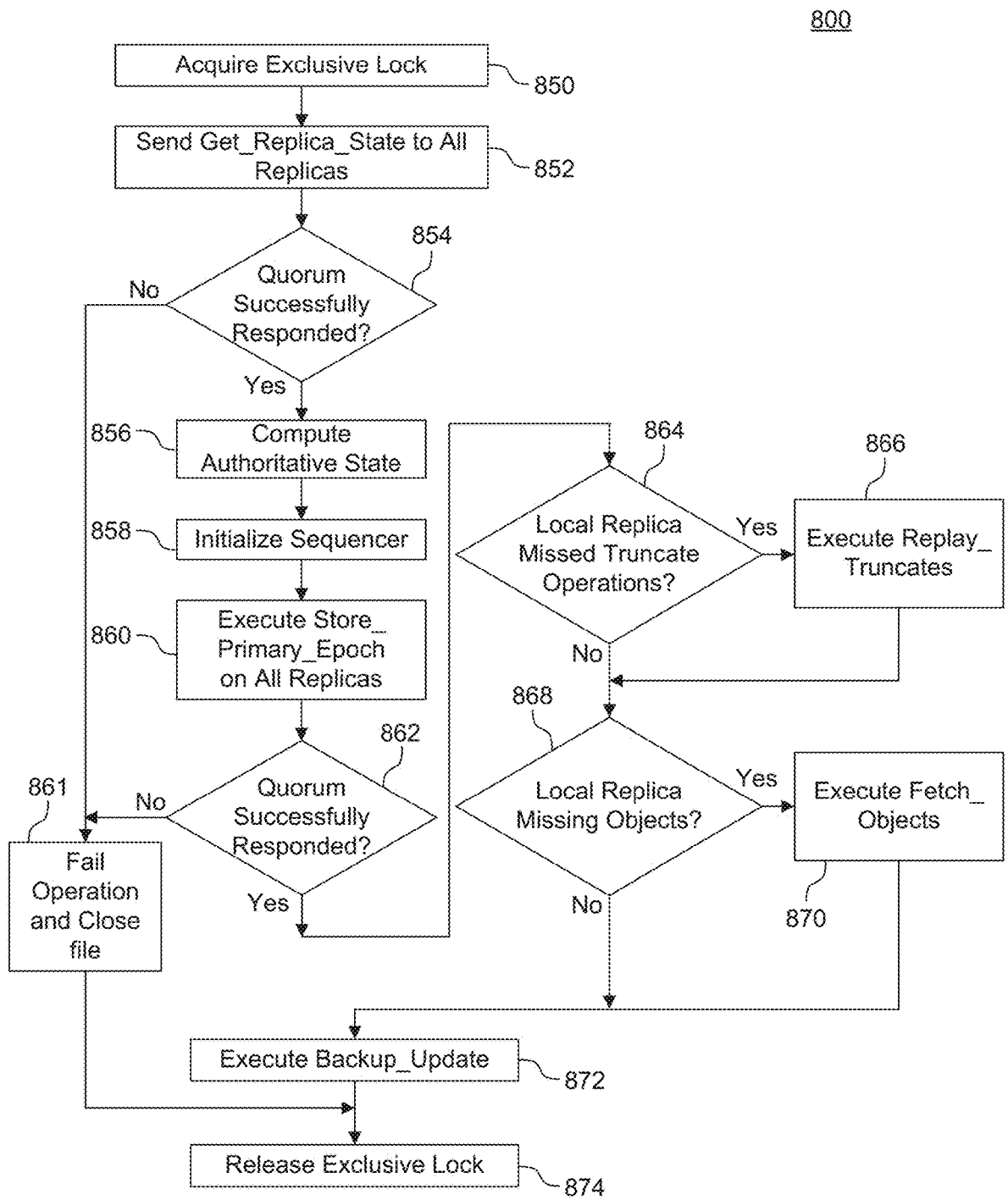
FIG. 8 is a flow chart illustrating an exemplary process for performing a PRIMARY_RESET operation.

FIG. 8 is a flow chart illustrating an exemplary process 800 for performing a PRIMARY_RESET operation (e.g., PRIMARY_RESET operation request). As explained in more detail above with reference to FIG. 2, the PRIMARY_RESET operation is invoked as part of an open sequence on a primary replica, typically after the primary role has been established and before the file is considered open and operational.

Because the replication systems and methods described herein use quorums to achieve fault tolerance, an operation is successful as long as the quorum has successfully applied and/or successfully performed the operation. However, the quorum (e.g., the subset of replicas that have successfully performed an operation) may change for each operation, and therefore it may be the case that there is no pair of replicas that store the same data. While the latest (e.g., newest) data (e.g., some or all of updates to a file) may not actually be stored and/or reflected on any of the replicas, the latest data is still well-defined as the result of the sequence of successful operations. The knowledge of the latest data (e.g., state of the data) is a used (e.g., as a precondition) to be able to process read operations and apply any further modifications (e.g., write operations) to the data.

That is, in order to establish the latest state of the data, the state of at least a quorum of replicas needs to be gathered and the latest state of the data is computed from these states. This process is performed using the PRIMARY_RESET operation on the primary replica. The latest state of the data (e.g., the file) is the authoritative state, because it defines how each replica should look like if it had received the full sequence operations (e.g., all writes, truncate, etc.). After the authoritative state is established, the primary replica is operable to accept operations. It is also capable of bringing any replica up to date so that its persistent state is actually equal to the authoritative state. The process of updating a replica to the authoritative state is referred to as enforcing the authoritative state on the replica, which is independent of what the current persistent state of the replica actually is.

In FIG. 8, an exclusive lock is acquired by the PRIMARY_RESET operation at step 850. In turn, at step 852, a GET_REPLICA_STATE request is concurrently transmitted to one or more remote (e.g., secondary) replicas and to the local (e.g., primary) replica. At step 854, it is determined whether a quorum has successfully responded to the GET_REPLICA_STATE. If it is determined that a quorum has not responded, or has not responded with a success message, the procedure is deemed, at step 861, to have failed and thus the file is kept closed.

In turn, at step 856, the authoritative state (auth(F)) is computed for each received response to the GET_REPLICA_STATE operation. The authoritative state of a file consists of the authoritative state of the file data as represented by its objects and their versions, the authoritative truncate log, and the authoritative primary epoch.

At step 858, the sequencer is initialized using the current primary epoch. In turn, at step 860, the primary epoch is stored on all available remote replicas with by calling a STORE PRIMARY EPOCH operation. The STORE PRIMARY EPOCH is used to store a received epoch locally in the replica metadata. In some example embodiments, the epoch is stored only if the received epoch is larger (e.g., newer version) than the currently stored epoch.

If the quorum (e.g., majority) fails to respond to the STORE PRIMARY EPOCH operation, as determined in step 862, the PRIMARY_RESET operation is deemed to have failed, at step 861, and the file stays closed. Otherwise, the computed authoritative state is applied to the local (e.g., primary) replica.

In turn, at step 864, a determination is made as to whether the local (e.g., primary) replica missed any truncates that are present in the authoritative state. If so, a REPLAY_TRUNCATES operation is executed, at step 866. In turn, a determination is made, at step 868, as to whether the local (e.g., primary) replica is missing objects or has obsolete versions. If so, a FETCH_OBJECTS operation is executed, at step 870, for the missing or outdated objects. As a result, the local replica is consistent with the authoritative state.

In turn, in some example implementations, the authoritative state is enforced, at step 872, is executed on all available remote (e.g., secondary) replicas using a BACKUP_UPDATE operation. By virtue of this operation, data safety is improved as the current state of the data is persistently stored on all available replicas. In some example implementations, the GET_REPLICA_STATE operation and STORE_PRIMARY_EPOCH operation can be merged.

For example, upon receiving a GET_REPLICA_STATE operation, a replica increases its local primary epoch and returns it as part of the GET_REPLICA_STATE response. If the primary replica receives the same (e.g., incremented) primary epoch from all available replicas from the quorum, it can skip the subsequent STORE_PRIMARY_EPOCH operation, thereby saving a round-trip communication.

Figure 9:
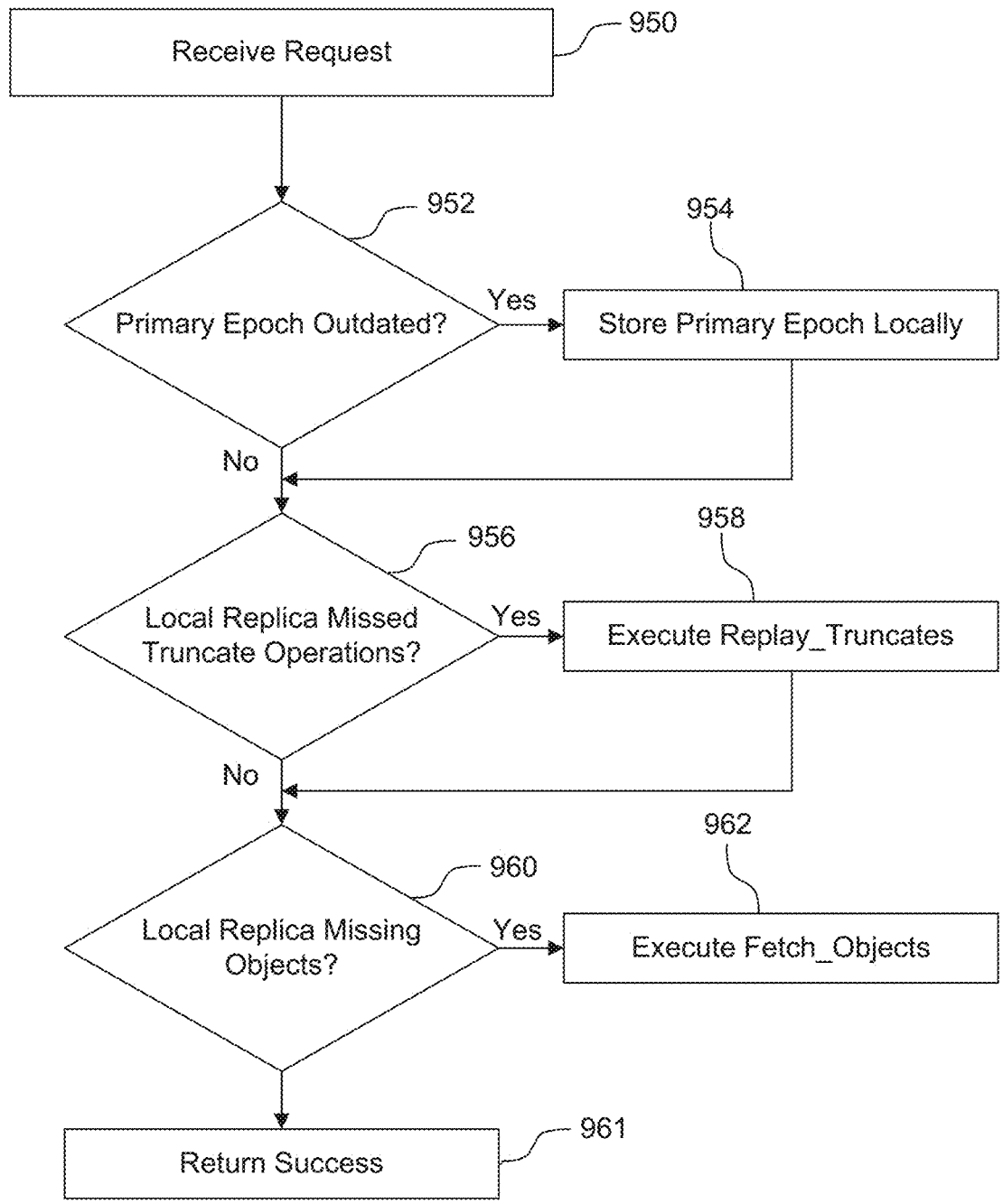
FIG. 9 is a flow chart illustrating an exemplary process for performing a BACKUP_UPDATE operation.

FIG. 9 is a flow chart illustrating an exemplary process 900 for performing a BACKUP_UPDATE operation (e.g., BACKUP_UPDATE operation request). The BACKUP_UPDATE operation is generally used to enforce (e.g., apply) the authoritative state on remote (e.g., secondary) replicas, for example, by bringing the persistent data of the remote replica up to date.

At step 950, the BACKUP_UPDATE operation is received. At step 952, the local primary epoch of the local replica is checked to determine if it is outdated. In turn, at step 954, the primary epoch is updated (e.g., locally stored). At step 956, a determination is made as to whether the local truncate log is equal to the received truncate log. If it is determined, at step 956, that the truncate logs are not equal to each other, the REPLAY_TRUNCATES procedure is executed at step 958. In turn, at step 960, the local replica is checked to determine if it is missing or has outdated objects. If objects are deemed to be missing or outdated, the FETCH_OBJECTS operation is executed at step 962.

Figure 10:
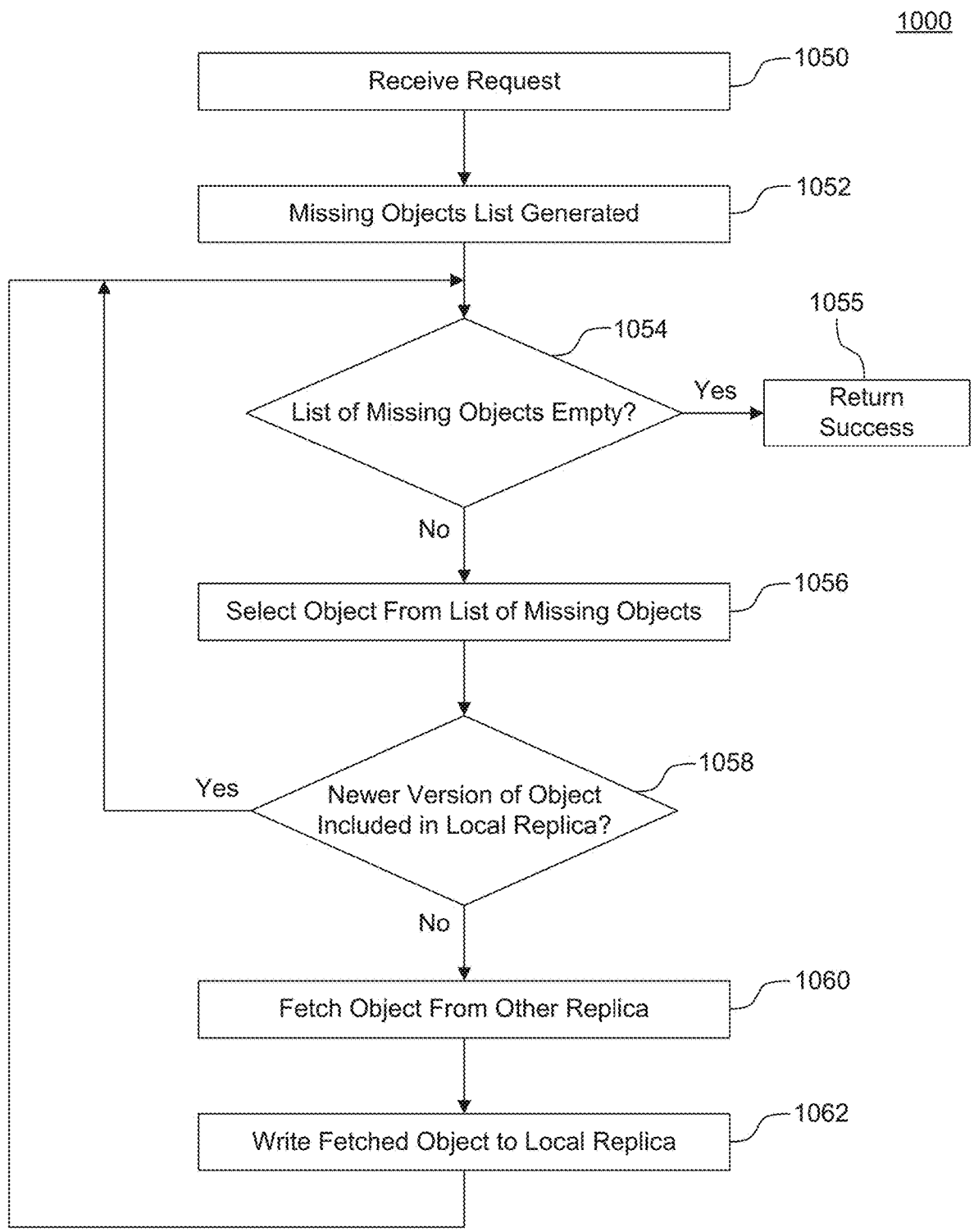
FIG. 10 is a flow chart illustrating an exemplary process for performing a FETCH_OBJECTS operation.

FIG. 10 is a flow chart illustrating an exemplary process 1000 for performing a FETCH_OBJECTS operation (e.g., FETCH_OBJECTS operation request).

At step 1050, a FETCH_OBJECTS operation is received, including a list of object versions (e.g., from the authoritative state). At step 1052, the received list of objects is compared with the locally known objects and their versions. That is, at step 1052, the set of missing objects is generated containing objects that are not present in the local replica, or objects that have a version older than the one in received set of objects. At step 1054, it is determined whether the generated set of objects not present in the local replica is empty. At step 1056, one of the objects in the set is selected and removed from the set. In turn, at step 1058, the locally known objects of the replica are checked to see if newer version of the removed object is included therein. If a new version does not exist, the object data for the specific version is fetched, at step 1060, from any other file replica (e.g., secondary replicas) and stores the fetched object data locally, at step 1062.

In some example implementations, a the object data of a file is stored separately from the object version of the file. In order to ensure that object data and its version are updated together atomically, a checksum of the object data is calculated (e.g., using cyclic redundancy check) and the checksum is stored with (e.g., next to) the object version in a block of the storage device as (version, checksum) pairs. In some example implementations, the checksum is calculated when the data is to be and/or being updated. In some example implementations, a checksum is performed using the version of an object. If an update is executed successfully, the checksum that is stored matches the actual checksum of the object data being updated, to determine whether the stored version corresponds to the object data. If an update of a version and object fails (e.g. because the change was interrupted before successfully updating the version and object data), the checksum will not match the object data. In such a scenario, it may not be possible to determine the version of the object data and the object will be treated as if it was not present on the replica. Thus, a subsequent primary reset will rereplicate the data through a BACKUP_UPDATE operation, which is described in further detail above with reference to FIG. 9.

In some example implementations, the replication system and method includes a distributed algorithm that executes across several participants (e.g., primary and secondary replicas, and their corresponding servers and/or storage devices). It is characterized through the changes of persistent state (e.g., file data and file replication metadata) on the replicas.

In some example implementations, it is possible to export the persistent state of secondary replicas for remote read and write operations. That is, replicas are operable to support operations that allow reading and modifying their state such as GET_TRUNATE_LOG, SET_TRUNCATE_LOG, GET_OBJECT, SET_OBJECT and the like.

In some example implementations, the BACKUP_WRITE operation executed on secondary replicas may be executed on a primary replica, thereby modifying the state of the secondary replicas by issuing operations like GET_OBJECT and GET TRUNCATE LOG, which modify their persistent state.

In some example implementations, performance can be improved by skipping the execution of the reset procedure on open, if, for example, it can be established that the majority of replicas already have the latest state (e.g., data, operations). That is, the reset process terminates by writing a marker that consists of the current primary epoch to all available replicas, indicating that they are currently up to date. A replica, primary or secondary, may delete this marker when it receives a TRUNCATE, BACKUP_TRUNCATE, WRITE or BACKUP_WRITE operation. When the file is being opened again, the new primary replica queries the secondary replica for the marker as part of the GET_REPLICA_STATE operation. If all available replicas return the marker with the same primary epoch, the authoritative is deemed to have been established and further steps of the primary reset procedure may be skipped.

When file data is being accessed with reads, and no writes or truncates, it is possible for the PRIMARY_RESET procedure to exclude the STORE_PRIMARY_EPOCH portion. That is, as the remaining steps of the open process do not require an update of persistent state, the performance of the open process may be improved.

In some example implementations, a substructure can be imposed on the objects to logically split the object into equalized subunits called blocks, which carry their own version and which can be modified as a whole. The version of the object is then the maximum version of any of its blocks. Using this additional substructure allows modifying the data in smaller units more efficiently, so that the amount of data that needs to be read, modified and written back is reduced, particularly for small changes.

In some example implementations, it is possible to enabling concurrent access to all available replicas that are read only files. Instead of negotiating an exclusive primary lease, replicas negotiate a shared lease that forbids all replicas to accept modifications to the data. The participating replicas, in turn, open the file and can then thus handle read operations and allow using aggregate resources of all available replicas.

In some example implementations, if it is not required to read the latest version of data, the replication services may allow access to the file replica data without opening and resetting the file.

In some systems (e.g., servers, storage devices), it is possible to cache data before it reaches the storage system. Caches implement the same semantics as the underlying storage system. For example, for a file cache, the cache needs to implement file semantics as described above. In an embodiment, in which a cache is put in front of the storage system, the cache can perform ordering and versioning operations before sending them to the primary file replica. In such an embodiment, the primary replica need not perform ordering and versioning processes. In some example implementations, the primary replica may delegate its roles, duties and/or responsibilities to the client and/or cache. In turn, the client and/or cache having the duties of a primary replica, can order and version replicas, among other things, as needed.

Figure 11:
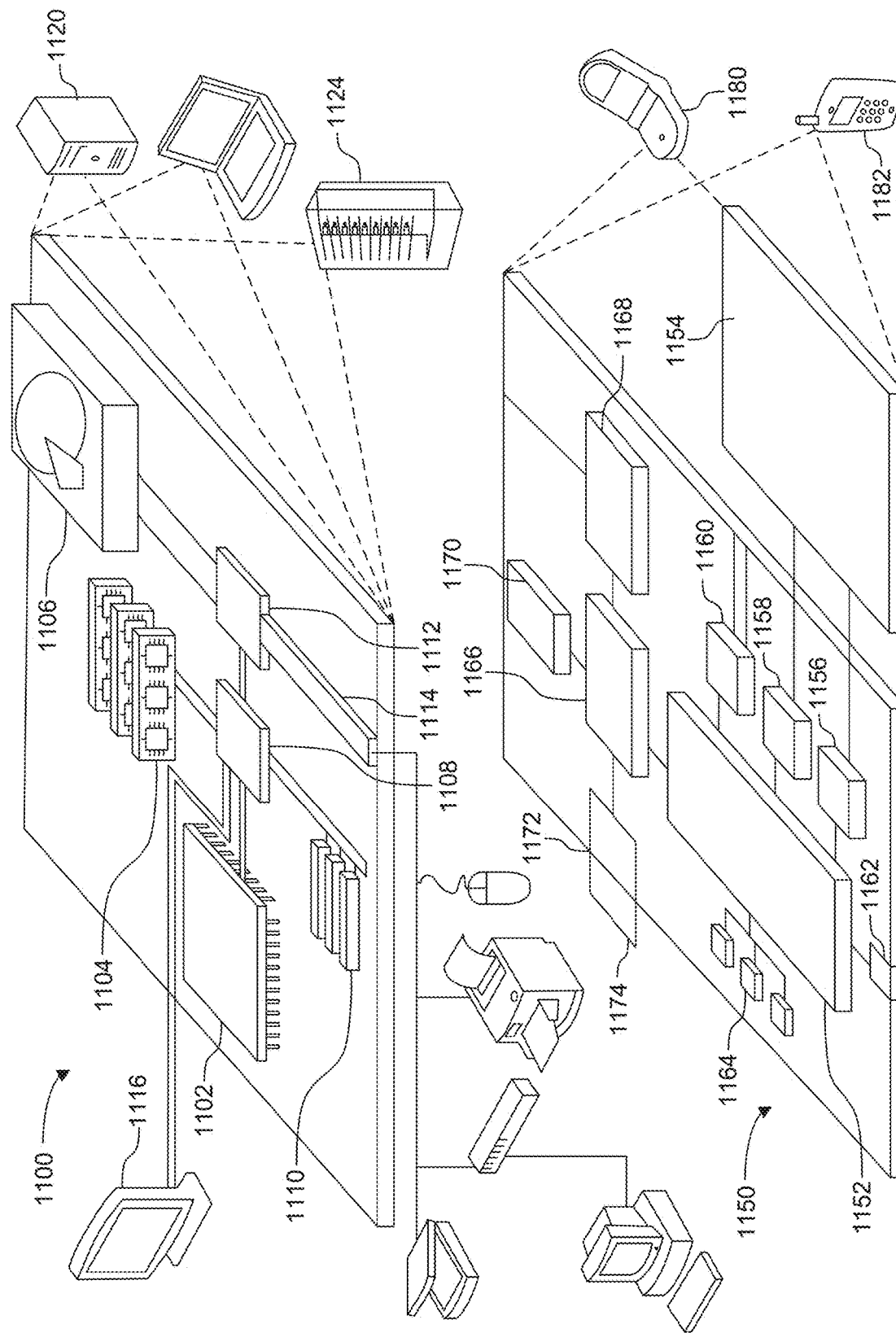
FIG. 11 shows an exemplary computing device and mobile computing device.

FIG. 11 shows an example of a computing device 1100 and a mobile computing device 1150 that can be used to implement the techniques described in this disclosure. The computing device 1100 is intended to represent various forms of digital computers, such as laptops, desktops, workstations, personal digital assistants, servers, blade servers, mainframes, and other appropriate computers. The mobile computing device 1150 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1100 may include a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 may also be another form of computer-readable medium, such as a magnetic or optical disk.

The storage device 1106 is capable of providing mass storage for the computing device 1100. In some implementations, the storage device 1106 may be or contain a computer-readable medium, such as a floppy disk device, a hard disk device, an optical disk device, or a tape device, a flash memory or various solid state memory device, or an array of devices, including devices in a storage area network or various configurations. Instructions can be stored in an information carrier. The instructions, when executed by one or more processing devices (for example, processor 1102), perform one or more methods, such as those described above. The instructions can also be stored by one or more storage devices such as computer- or machine-readable mediums (for example, the memory 1104, the storage device 1106, or memory on the processor 1102).

The high-speed interface 1108 manages bandwidth-intensive operations for the computing device 1100, while the low-speed interface 1112 manages lower bandwidth-intensive operations. Such allocation of functions is an example only. In some implementations, the high-speed interface 1108 is coupled to the memory 1104, the display 1116 (e.g., through a graphics processor or accelerator), and to the high-speed expansion ports 1110, which may accept various expansion cards (not shown). In the implementations, the low-speed interface 1112 is coupled to the storage device 1106 and the low-speed expansion port 1114. The low-speed expansion port 1114, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. In addition, it may be implemented in a personal computer such as a laptop computer 1122. It may also be implemented as part of a rack server system 1124. Alternatively, components from the computing device 1100 may be combined with other components in a mobile device (not shown), such as a mobile computing device 1150. Each of such devices may contain one or more of the computing device 1100 and the mobile computing device 1150, and an entire system may be made up of multiple computing devices communicating with each other.

The mobile computing device 1150 may include a processor 1152, a memory 1164, an input/output device such as a display 1154, a communication interface 1166, and a transceiver 1168, among other components. The mobile computing device 1150 may also be provided with a storage device, such as a micro-drive or other device, to provide additional storage. Each of the processor 1152, the memory 1164, the display 1154, the communication interface 1166, and the transceiver 1168, are interconnected using various buses, and several of the components may be mounted on a common motherboard or in other manners as appropriate.

The processor 1152 can execute instructions within the mobile computing device 1150, including instructions stored in the memory 1164. The processor 1152 may be implemented as a chipset of chips that include separate and multiple analog and digital processors. The processor 1152 may provide, for example, for coordination of the other components of the mobile computing device 1150, such as control of user interfaces, applications run by the mobile computing device 1150, and wireless communication by the mobile computing device 1150.

The processor 1152 may communicate with a user through a control interface 1158 and a display interface 1156 coupled to the display 1154. The display 1154 may be, for example, a TFT (Thin-Film-Transistor Liquid Crystal Display) display or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may provide communication with the processor 1152, so as to enable near area communication of the mobile computing device 1150 with other devices. The external interface 1162 may provide, for example, for wired communication in some implementations, or for wireless communication in other implementations, and multiple interfaces may also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 may also be provided and connected to the mobile computing device 1150 through an expansion interface 1172, which may include, for example, a SIMM (Single In Line Memory Module) card interface. The expansion memory 1174 may provide extra storage space for the mobile computing device 1150, or may also store applications or other information for the mobile computing device 1150. Specifically, the expansion memory 1174 may include instructions to carry out or supplement the processes described above, and may include secure information also. Thus, for example, the expansion memory 1174 may be provide as a security module for the mobile computing device 1150, and may be programmed with instructions that permit secure use of the mobile computing device 1150. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 1152), perform one or more methods, such as those described above. The instructions can also be stored by one or more storage devices, such as one or more computer- or machine-readable mediums (for example, the memory 1164, the expansion memory 1174, or memory on the processor 1152). In some implementations, the instructions can be received in a propagated signal, for example, over the transceiver 1168 or the external interface 1162.

The mobile computing device 1150 may communicate wirelessly through the communication interface 1166, which may include digital signal processing circuitry where necessary. The communication interface 1166 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1168 using a radio-frequency. In addition, short-range communication may occur, such as using a Bluetooth®, Wi-Fi™, or other such transceiver (not shown). In addition, a GPS (Global Positioning System) receiver module 1170 may provide additional navigation- and location-related wireless data to the mobile computing device 1150, which may be used as appropriate by applications running on the mobile computing device 1150.

The mobile computing device 1150 may also communicate audibly using an audio codec 1160, which may receive spoken information from a user and convert it to usable digital information. The audio codec 1160 may likewise generate audible sound for a user, such as through a speaker, e.g., in a handset of the mobile computing device 1150. Such sound may include sound from voice telephone calls, may include recorded sound (e.g., voice messages, music files, etc.) and may also include sound generated by applications operating on the mobile computing device 1150.

The mobile computing device 1150 may be implemented in a number of different forms, as shown in the figure. For example, it may be implemented as a cellular telephone 1180. It may also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that may include a back end component (e.g., as a data server), or that may include a middleware component (e.g., an application server), or that may include a front end component (e.g., a client computer having a graphical user interface or a Web browser through which a user can interact with an implementations of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, a system and method for injecting state and routing information into a communication exchange between a platform server and an end-point device over a stateless persistent connection are provided. Having described certain implementations of methods and apparatus for supporting injection of the state and routing information into the communication exchange, it will now become apparent to one of skill in the art that other implementations incorporating the concepts of the disclosure may be used.

Moreover, in view of the structure, functions and apparatus of the systems and methods described here, in some implementations, a system and method for communication over a set of persistent connections between two network nodes and an intermediary node are provided. Having described certain implementations of methods and apparatus for supporting communication over the persistent connection, it will now become apparent to one of skill in the art that other implementations incorporating the concepts of the disclosure may be used.

Moreover, in view of the structure, functions and apparatus of the systems and methods described here, in some implementations, a system and method for communication over a set of persistent connections between two network nodes and an intermediary node are provided. Having described certain implementations of methods and apparatus for supporting communication over the persistent connection, it will now become apparent to one of skill in the art that other implementations incorporating the concepts of the disclosure may be used.

Therefore, the disclosure should not be limited to certain implementations, but rather should be limited only by the spirit and scope of the following claims.

What is claimed is:

1. A system for providing fault-tolerant file replication, comprising:
   a memory operable to store a plurality of local replica files, and
   a processor coupled to the memory, the processor being operable to:
      receive, from a client system over a network, a request including an operation and a file identifier;
      determine if the operation is of a predetermined type of operations; and
      in the event that it is determined that the operation is of a predetermined type of operation:
         identify a target local replica file, from the plurality of local replica files stored in the memory, associated with the file identifier;
         determine whether the target local replica file is a primary replica;
         in the event that the target local replica file is the primary replica: execute the operation included in the request; and in the event that the target local replica file is not the primary replica:
transmit a response, to the client system, indicating that the target local replica file is not the primary replica.

2. The system of claim 1, wherein the predetermined type of operation is one of a read operation, a write operation and a truncate operation.

3. The system of claim 1, wherein the processor is operable to:
determine whether any of the target local replica file and remote replica files associated with a target file is the primary replica; and
in the event that none of the target local replica file and the remote replica files associated with the target file is the primary replica:
transmit the target local replica file or an identifier corresponding to the target local replica file to a primary election service, to establish the primary replica from one of the target local replica file and the remote replica files associated with the target file.

4. The system of claim 1,
wherein each of the plurality of local replica files includes a corresponding identifier, a sequence of objects, metadata, a truncate operation log, and a size of each object in the sequence of objects, and
wherein the metadata includes a primary epoch, and each object in the sequence of objects includes a respective version.

5. The system of claim 4,
wherein the operation included in the request is a write operation,
wherein the request includes an object offset and data, and
wherein the processor is operable to:
update an object corresponding to the object offset in the target local replica file using the data included in the request; and
transmit, over the network, to one or more of a set of storage devices on which remote replica files associated with the target file are stored, instructions to update an object corresponding to the object offset in the respective remote replica file, using the data received in the request.

6. The system of claim 1, wherein the processor is operable to:
modify the target local replica file based on the request; and, concurrently,
transmit instructions to one or more of a set of storage devices on which remote replica files associated with the target file are stored, to modify the remote replica files associated with the target file based on the request.

7. The system of claim 6, wherein the operation included in the request is a write operation or a truncate operation.

8. The system of claim 6, wherein the processor is further operable to:
receive a response from each of the one or more of the set of storage devices on which the remote replica files associated with the file identifier are stored, the response indicating whether modifying the remote replica files succeeded; and
determine that the replication of the target file succeeded when the number of received responses matches or exceeds a predetermined quorum value.

9. A method for providing fault-tolerant file replication, comprising steps of:
receiving, from a client system over a network, a request including an operation and a file identifier;
determining if the operation is of a predetermined type of operations; and
in the event that it is determined that the operation is of a predetermined type of operation:
identifying a target local replica file, from a plurality of local replica files stored in a memory, associated with the file identifier;
determining whether the target local replica file is a primary replica;
in the event that the target local replica file is the primary replica: executing the operation included in the request; and
in the event that the target local replica file is not the primary replica:
transmit a response, to the client system, indicating that the target local replica file is not the primary replica.

10. The method of claim 9, wherein the predetermined type of operation is one of a read operation, a write operation and a truncate operation.

11. The method of claim 9, further comprising steps of:
determining whether any of the target local replica file and remote replica files associated with a target file is the primary replica; and
in the event that none of the target local replica file and the remote replica files associated with the target file is the primary replica:
transmitting the target local replica file or an identifier corresponding to the target local replica file to a primary election service, to establish the primary replica from one of the target local replica file and the remote replica files associated with the target file.

12. The method of claim 9,
wherein each of the plurality of local replica files includes a corresponding identifier, a sequence of objects, metadata, a truncate operation log, and a size of each object in the sequence of objects, and
wherein the metadata includes a primary epoch, and each object in the sequence of objects includes a respective version.

13. The method of claim 12,
wherein the operation included in the request is a write operation,
wherein the request includes an object offset and data, and the method further comprising steps of:
updating an object corresponding to the object offset in the target local replica file using the data included in the request; and
transmitting, over the network, to one or more of a set of storage devices on which remote replica files associated with the target file are stored, instructions to update an object corresponding to the object offset in the respective remote replica file, using the data received in the request.

14. The method of claim 9, further comprising steps of:
modifying the target local replica file based on the request; and, concurrently,
transmitting instructions to one or more of a set of storage devices on which remote replica files associated with the target file are stored, to modify the remote replica files associated with the target file based on the request.

15. The method of claim 14, wherein the operation included in the request is a write operation or a truncate operation.

16. The method of claim 14, further comprising steps of:
receiving a response from each of the one or more of the set of storage devices on which the remote replica files associated with the file identifier are stored, the response indicating whether modifying the remote replica files succeeded; and determining that the replication of the target file succeeded when the number of received responses matches or exceeds a predetermined quorum value.

* * * * *